US011071950B2

(12) United States Patent
Lee

(10) Patent No.: US 11,071,950 B2
(45) Date of Patent: *Jul. 27, 2021

(54) MEMBRANE FILTRATION SYSTEM AND MEMBRANE BIO REACTOR INCLUDING THE SAME

(71) Applicant: DOOSAN HEAVY INDUSTRIES & CONSTRUCTION CO., LTD., Changwon-si (KR)

(72) Inventor: Woo Nyoung Lee, Changwon-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,256

(22) Filed: Sep. 2, 2019

(65) Prior Publication Data

US 2019/0381461 A1 Dec. 19, 2019

Related U.S. Application Data

(63) Continuation of application No. 15/694,302, filed on Sep. 1, 2017, now Pat. No. 10,434,474.

(30) Foreign Application Priority Data

Nov. 30, 2016 (KR) .................. 10-2016-0162327
Nov. 30, 2016 (KR) .................. 10-2016-0162328

(51) Int. Cl.
*B01D 63/16* (2006.01)
*B01D 65/08* (2006.01)
(Continued)

(52) U.S. Cl.
CPC .............. *B01D 63/16* (2013.01); *B01D 63/04* (2013.01); *B01D 65/08* (2013.01); *C02F 3/1273* (2013.01);
(Continued)

(58) Field of Classification Search
CPC ............ B01D 2313/20; B01D 2315/04; B01D 2315/05; B01D 2315/06; B01D 63/04;
(Continued)

(56) References Cited

U.S. PATENT DOCUMENTS

| 6,284,135 B1 | 9/2001 | Ookata |
| 2009/0250394 A1 | 10/2009 | Taylor |
| 2014/0097132 A1 | 4/2014 | Ho et al. |

FOREIGN PATENT DOCUMENTS

| CN | 105848762 A | 8/2016 |
| GB | 2163060 A | 2/1986 |

(Continued)

OTHER PUBLICATIONS

Fundamentals of Robot Techniques, Meng Qingxin etc., Harbin Institute of Technology Press, 1st edition, Sep. 2006, p. 189-190.

(Continued)

*Primary Examiner* — Terry K Cecil
(74) *Attorney, Agent, or Firm* — Invenstone Patent, LLC

(57) ABSTRACT

A membrane filtration system and a membrane bio reactor including the same are described. In an example, the membrane filtration system includes: a treatment tank; a membrane support frame disposed in the treatment tank and mounted with a filtration membrane; a reciprocating portion connected to the membrane support frame and reciprocating the membrane support frame; a sliding portion disposed in the treatment tank, connected to the reciprocating portion, and guiding a moving direction of the membrane support frame; and a sludge lifting portion flexibly disposed at a lower end of the membrane support frame to lift sludge accumulated at a lower part of the treatment tank.

12 Claims, 37 Drawing Sheets

(51) Int. Cl.
*B01D 63/04* (2006.01)
*C02F 3/12* (2006.01)
*C02F 3/28* (2006.01)

(52) U.S. Cl.
CPC ........ *C02F 3/2853* (2013.01); *B01D 2313/20* (2013.01); *B01D 2315/04* (2013.01); *B01D 2315/06* (2013.01); *C02F 2203/006* (2013.01)

(58) Field of Classification Search
CPC ... B01D 63/16; B01D 65/08; C02F 2203/006; C02F 3/1273; C02F 3/2853; Y02W 10/10
See application file for complete search history.

(56) References Cited

FOREIGN PATENT DOCUMENTS

| | | |
|---|---|---|
| JP | 10230261 A | 9/1998 |
| KR | 200197712 Y1 | 9/2000 |
| KR | 20130072505 A | 7/2013 |
| KR | 20140058111 A | 5/2014 |
| KR | 20150096647 A | 8/2015 |
| WO | 2012083390 A2 | 6/2012 |

OTHER PUBLICATIONS

Machinery foundation Experimentation, Zhang Jiping etc., National Defense Industry Press, 1st edition, Aug. 2014.

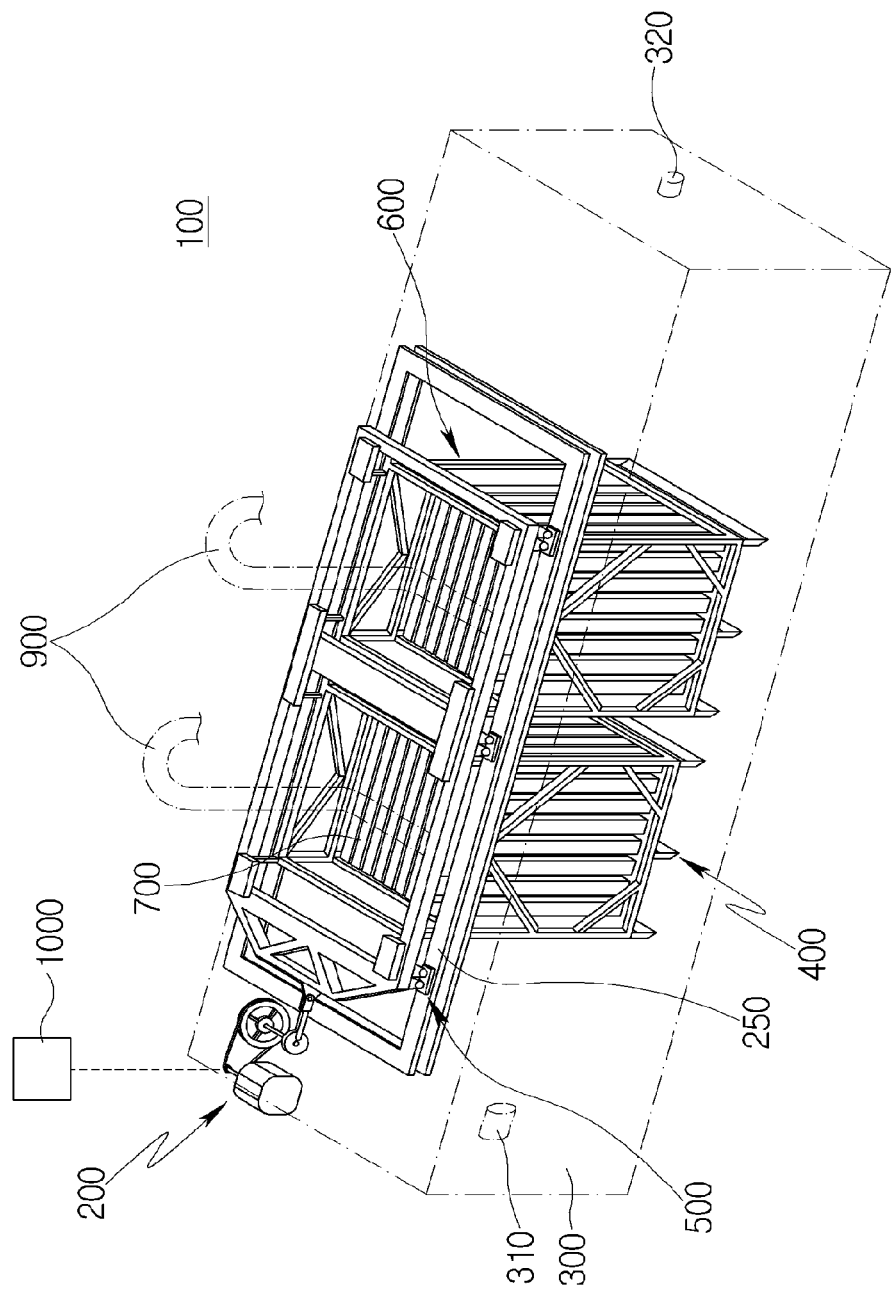
[FIG. 1]

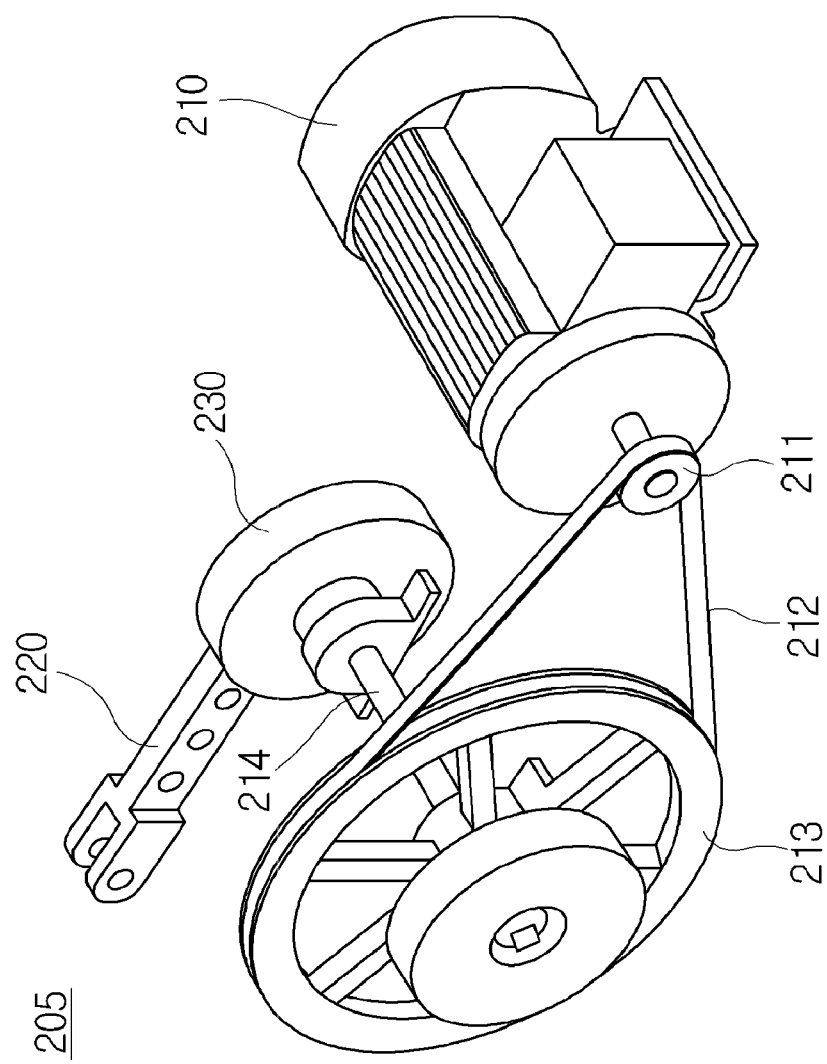

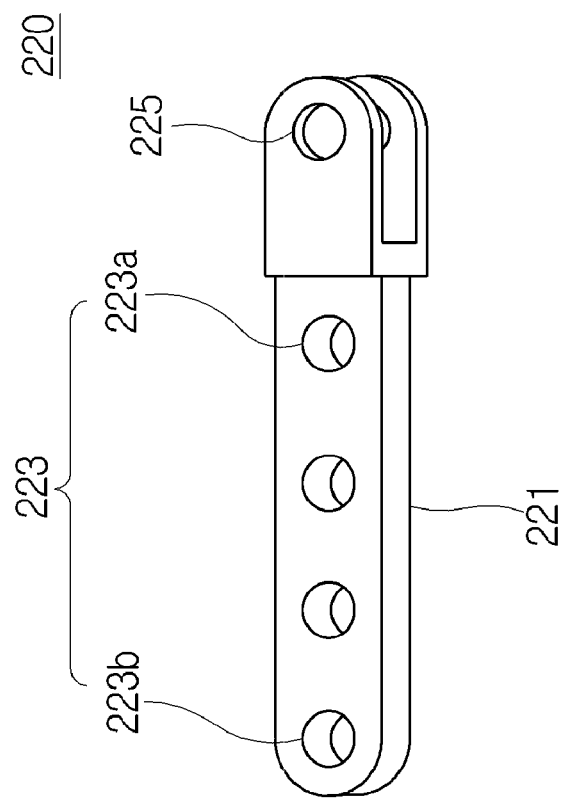

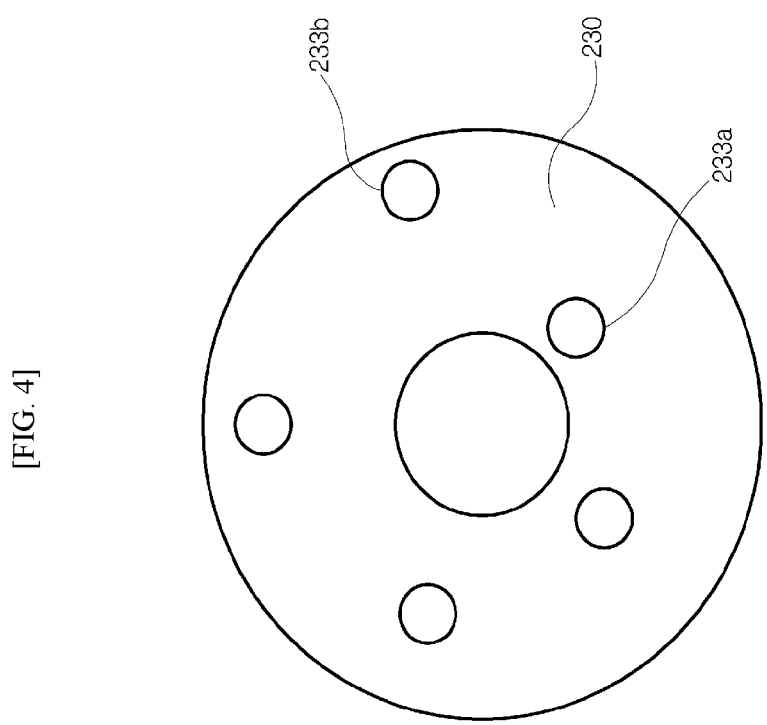
[FIG. 4]

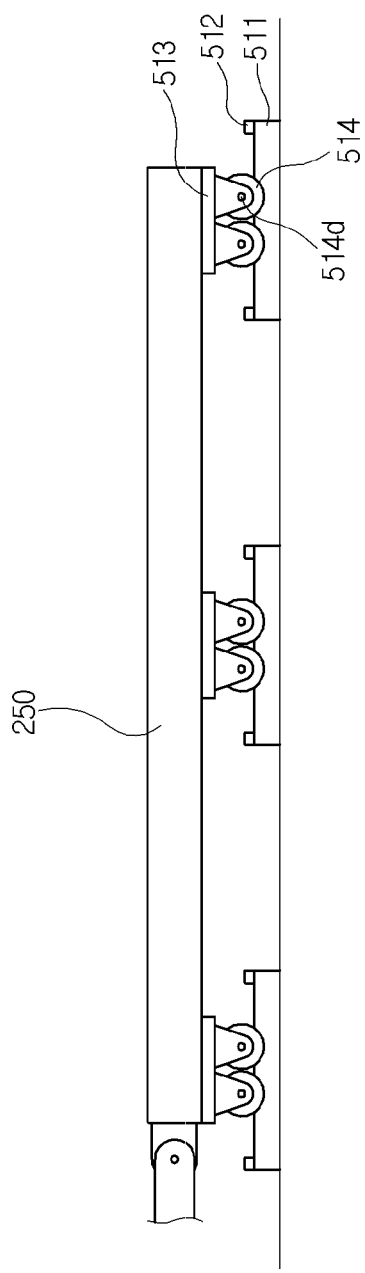
[FIG. 5]

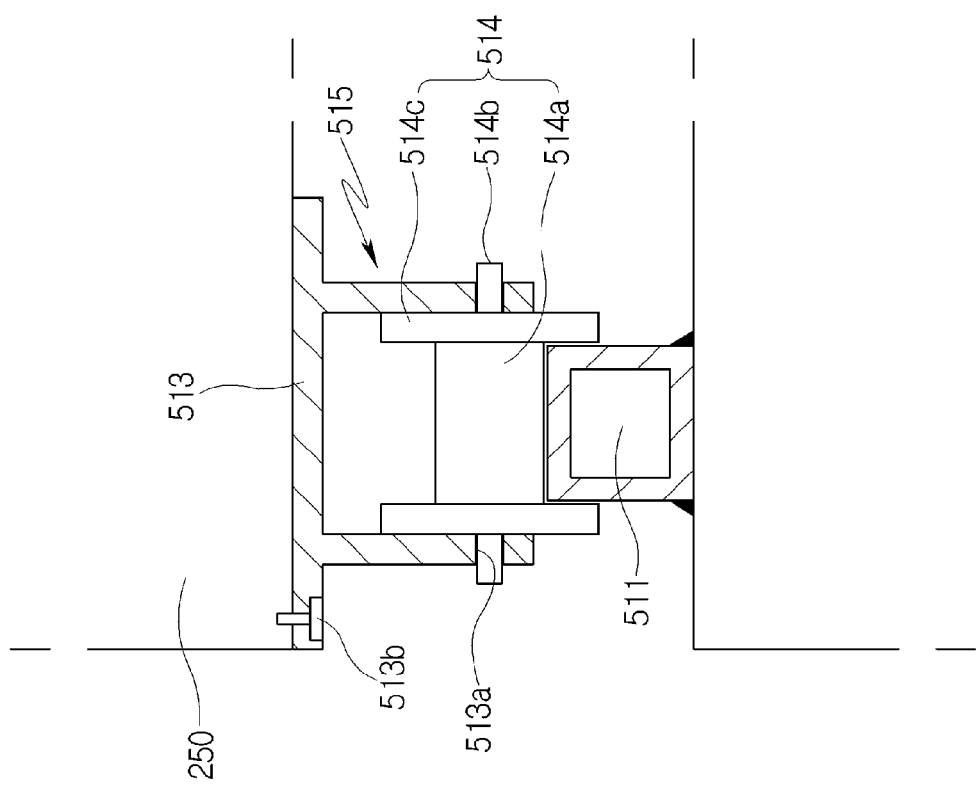
[FIG. 6]

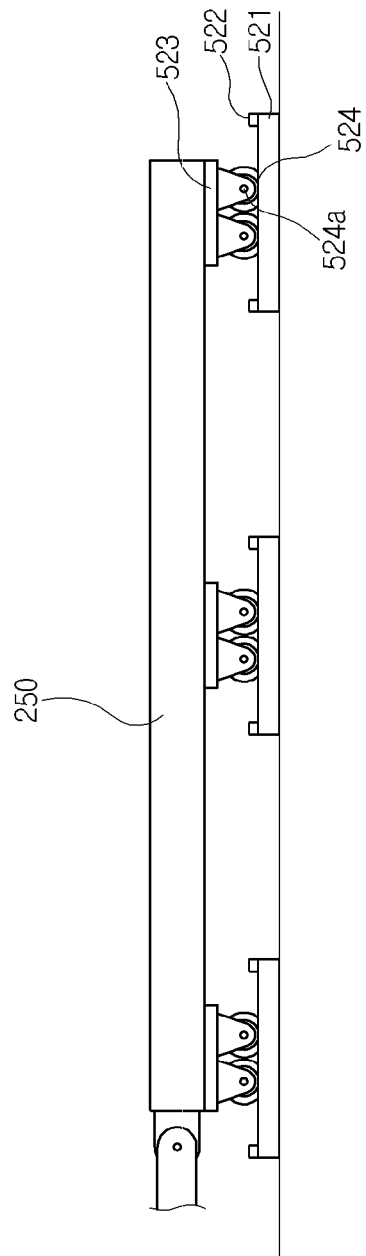

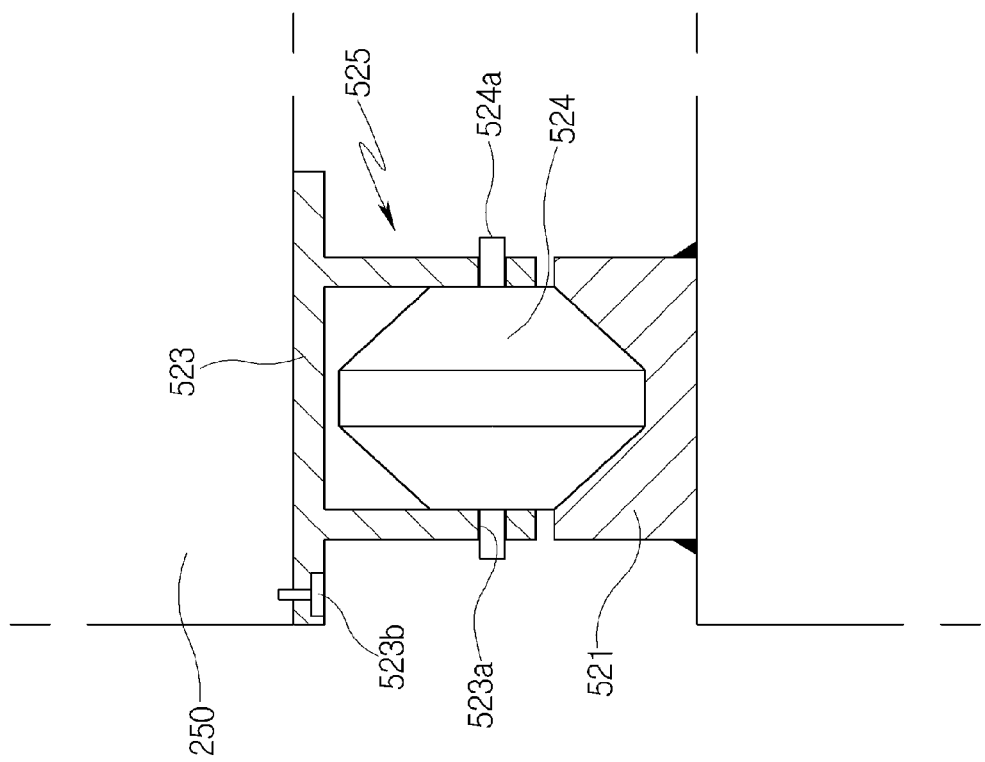

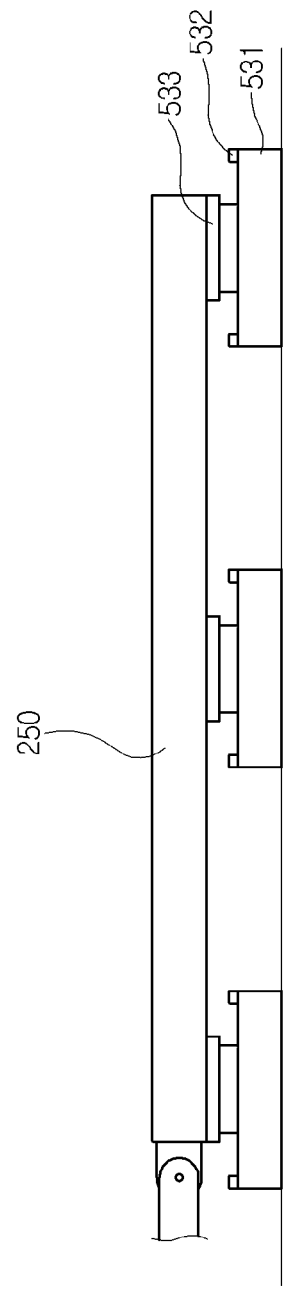
[FIG. 8A]

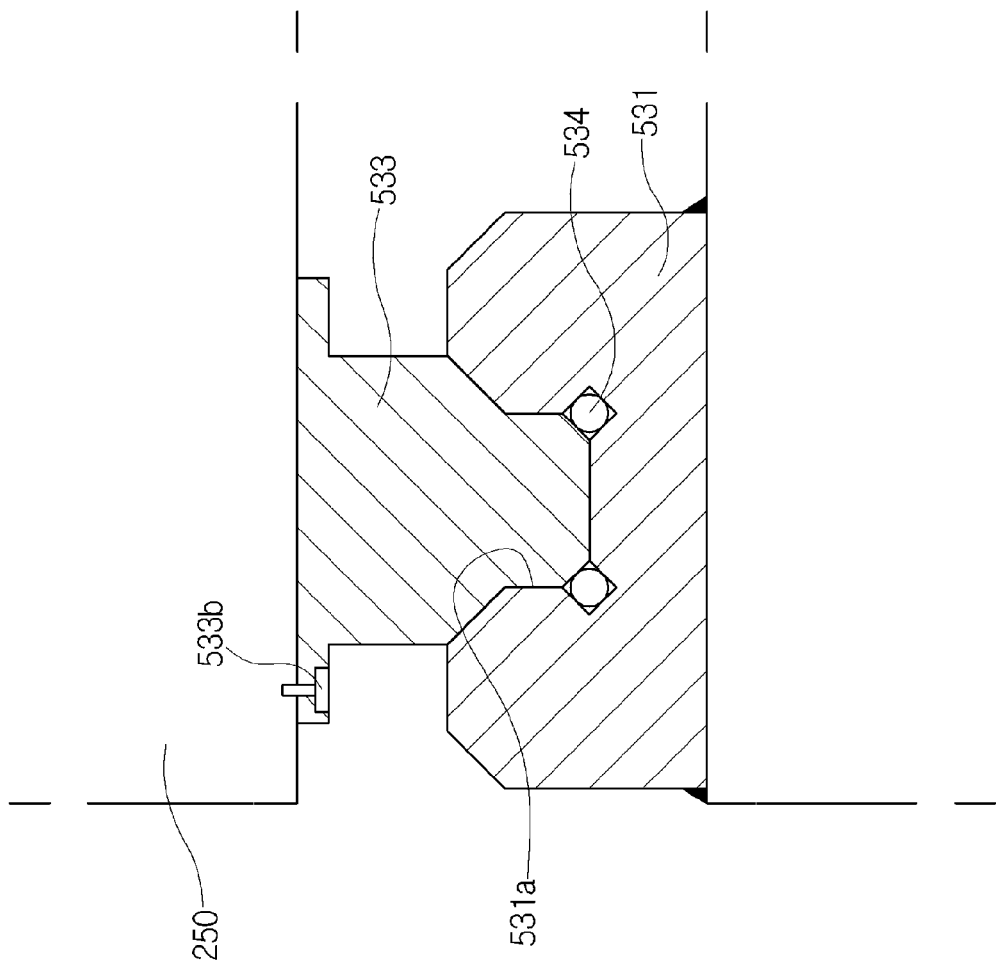

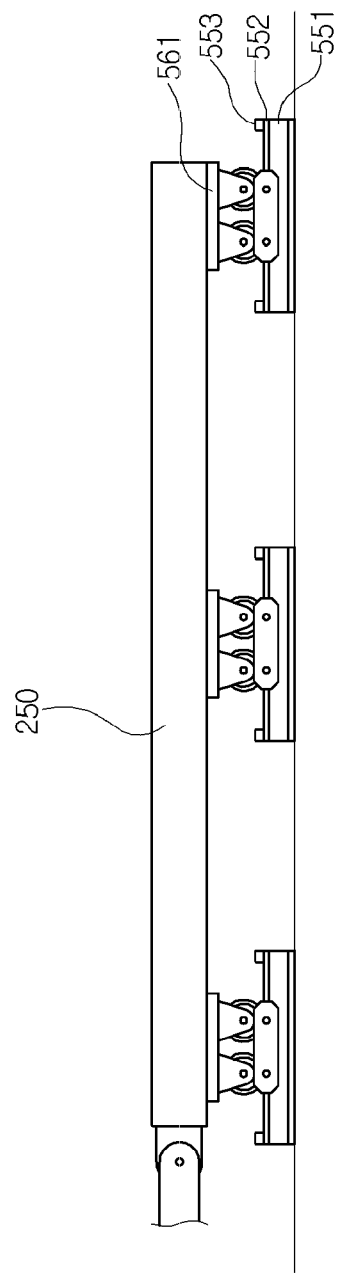

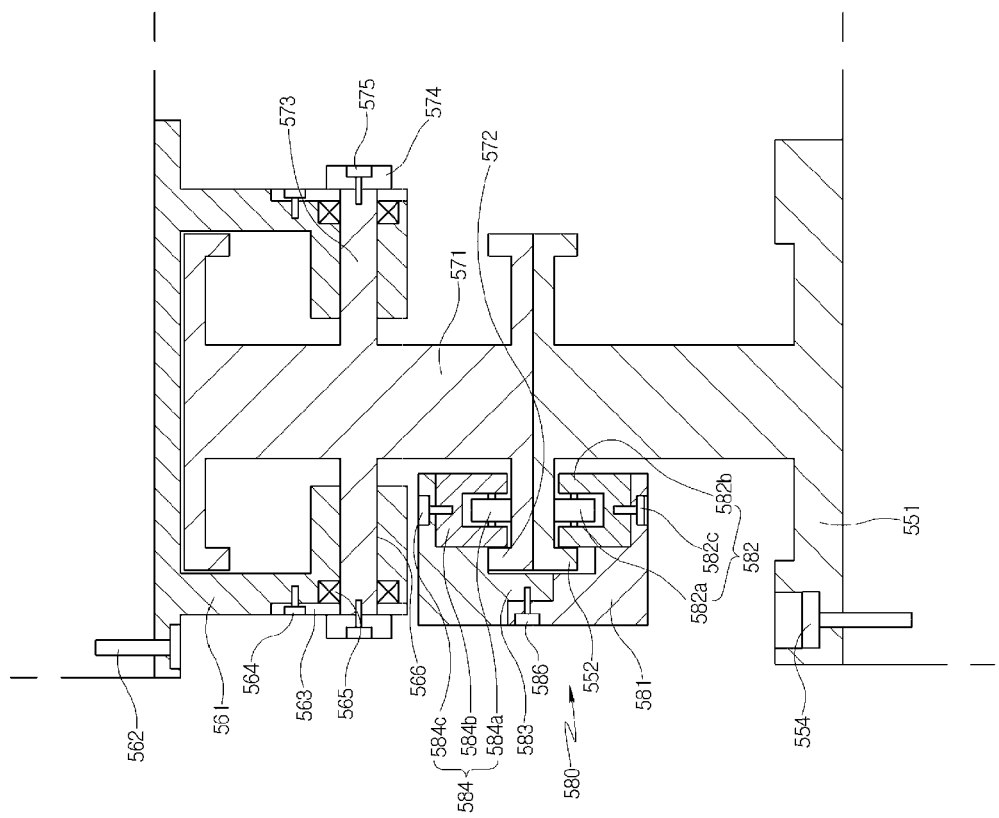
[FIG. 9B]

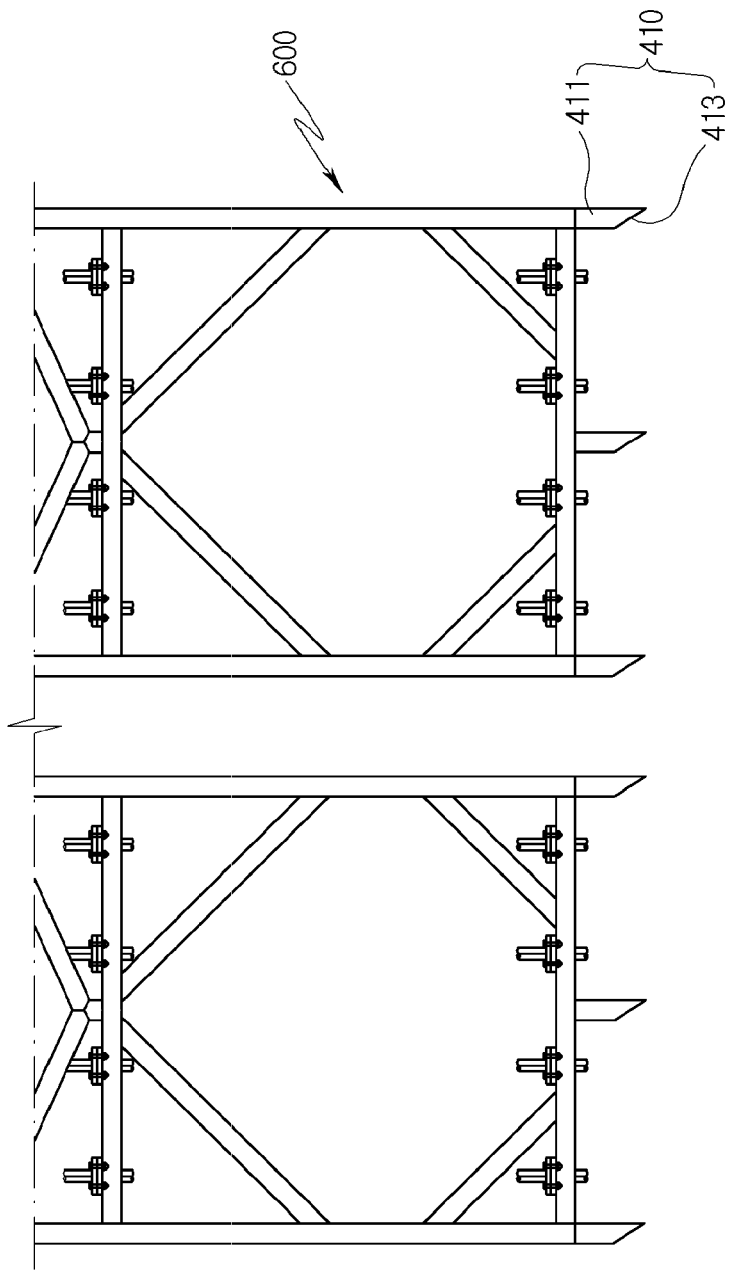

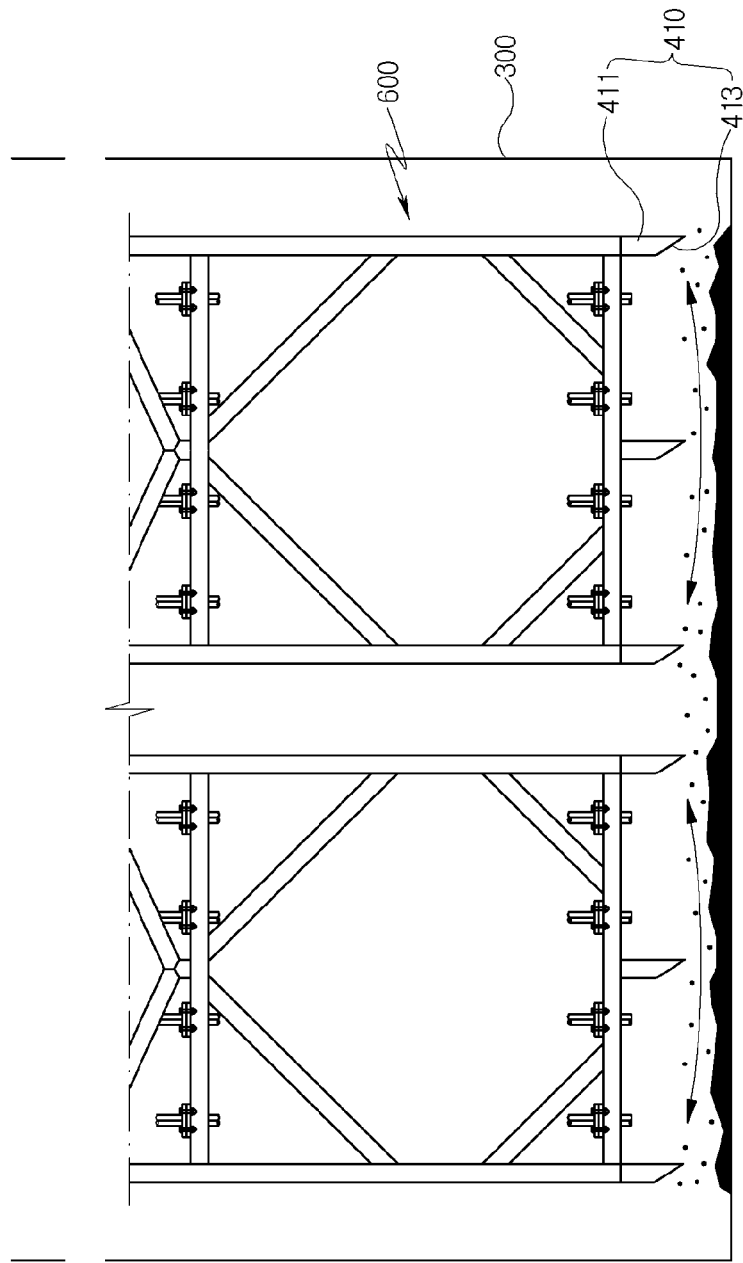
[FIG. 11]

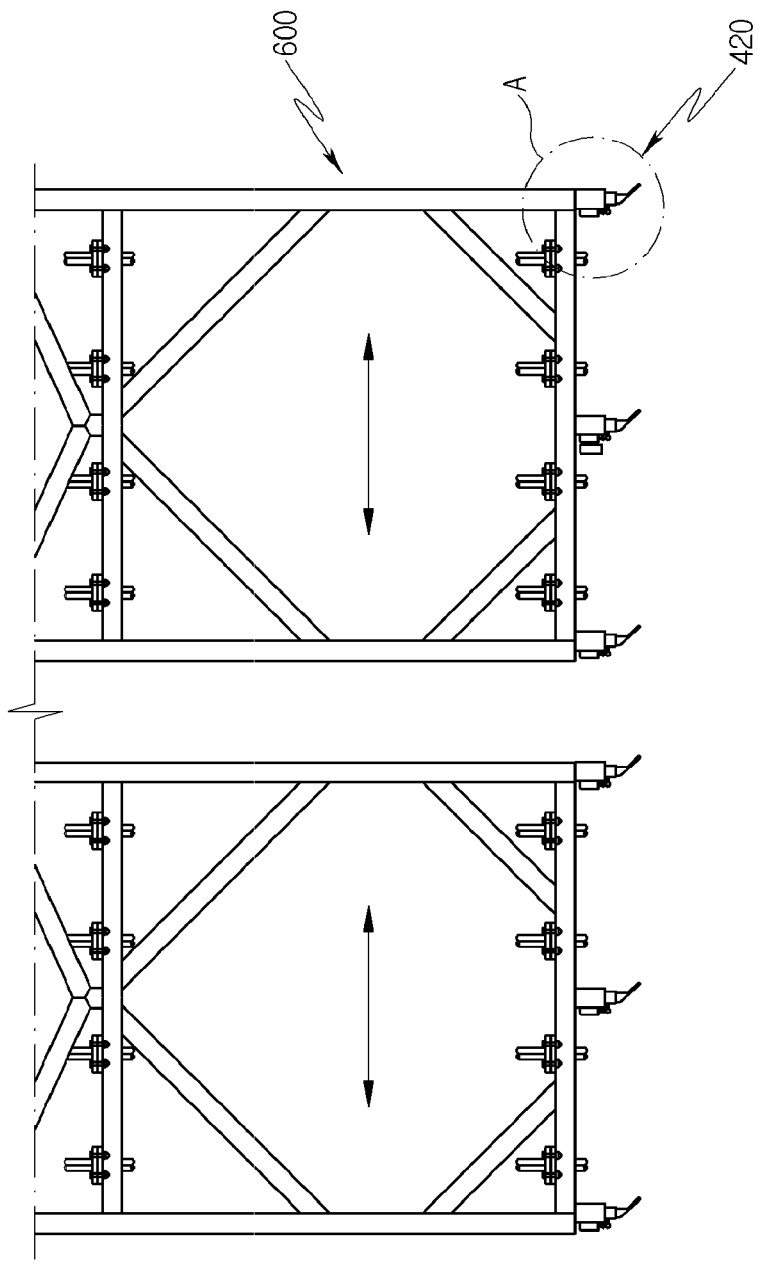
[FIG. 12]

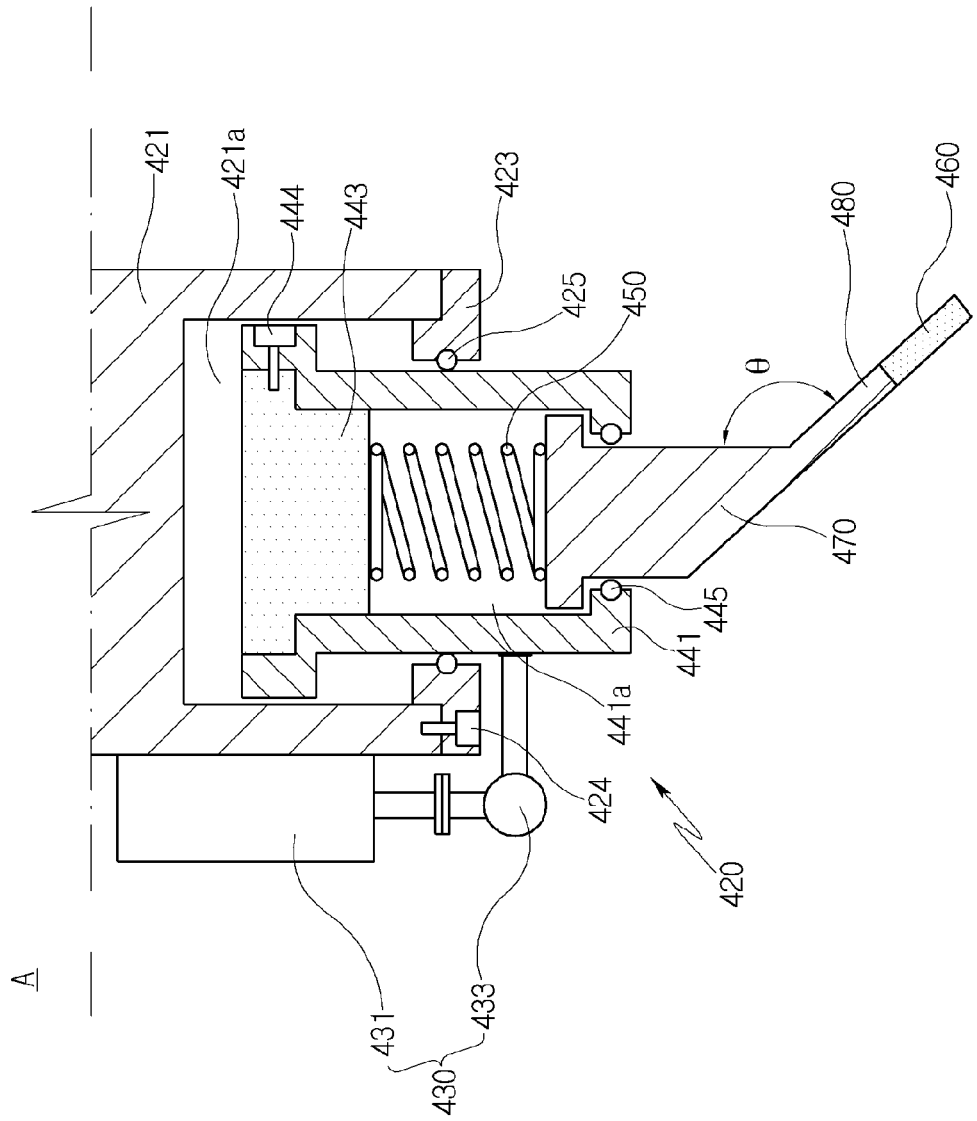

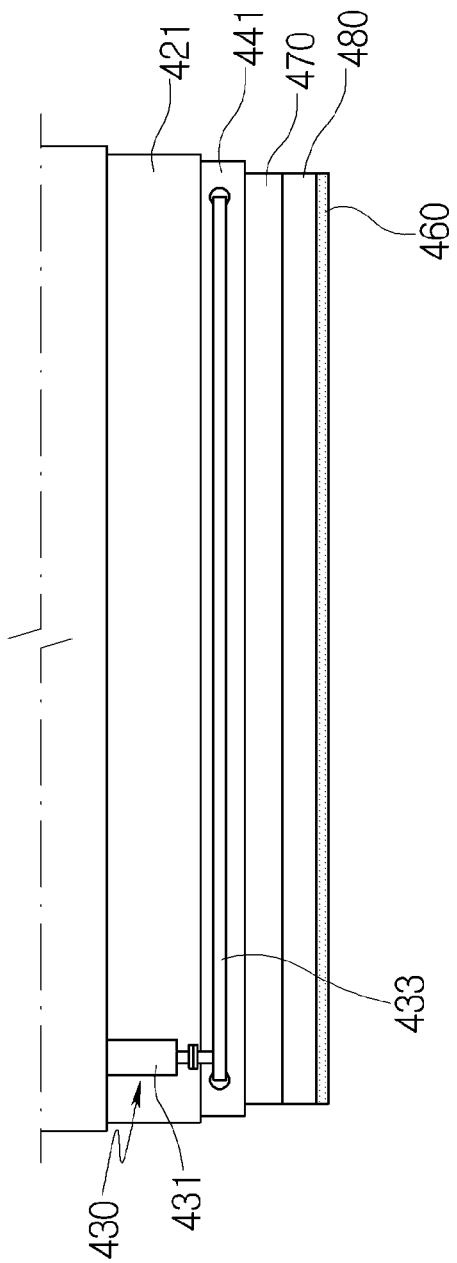

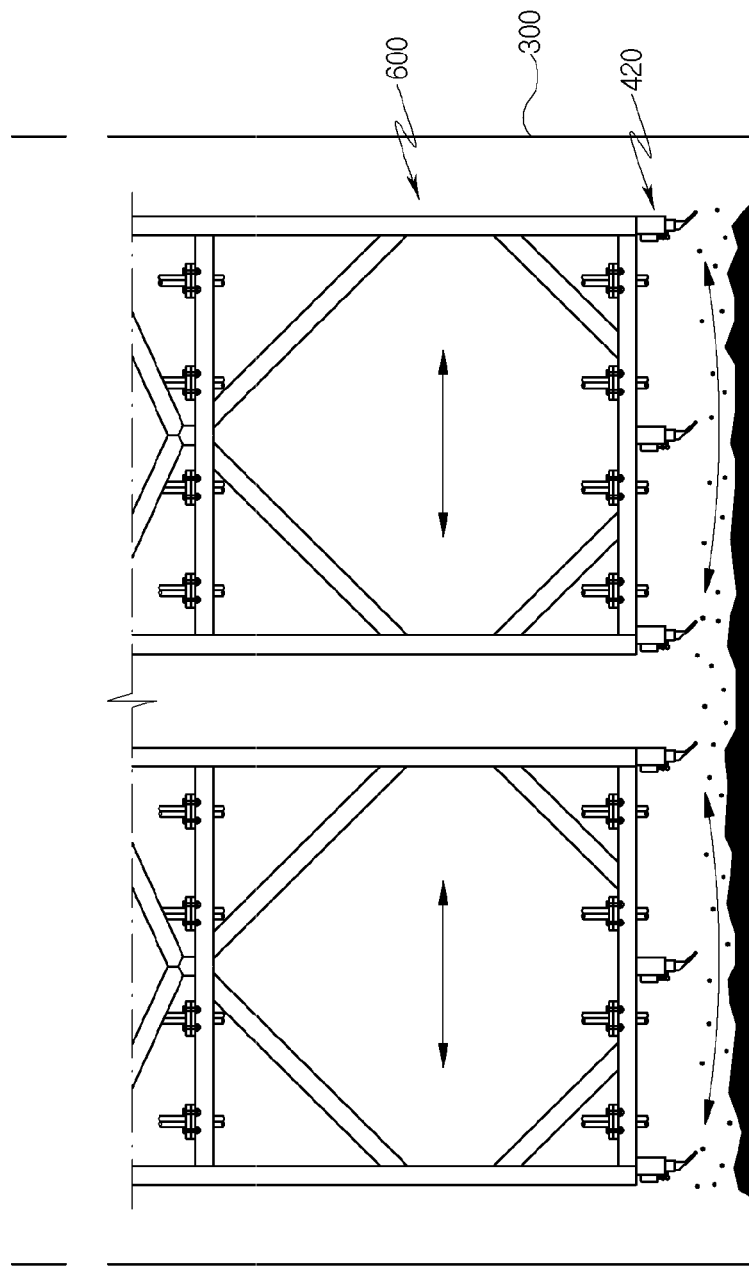

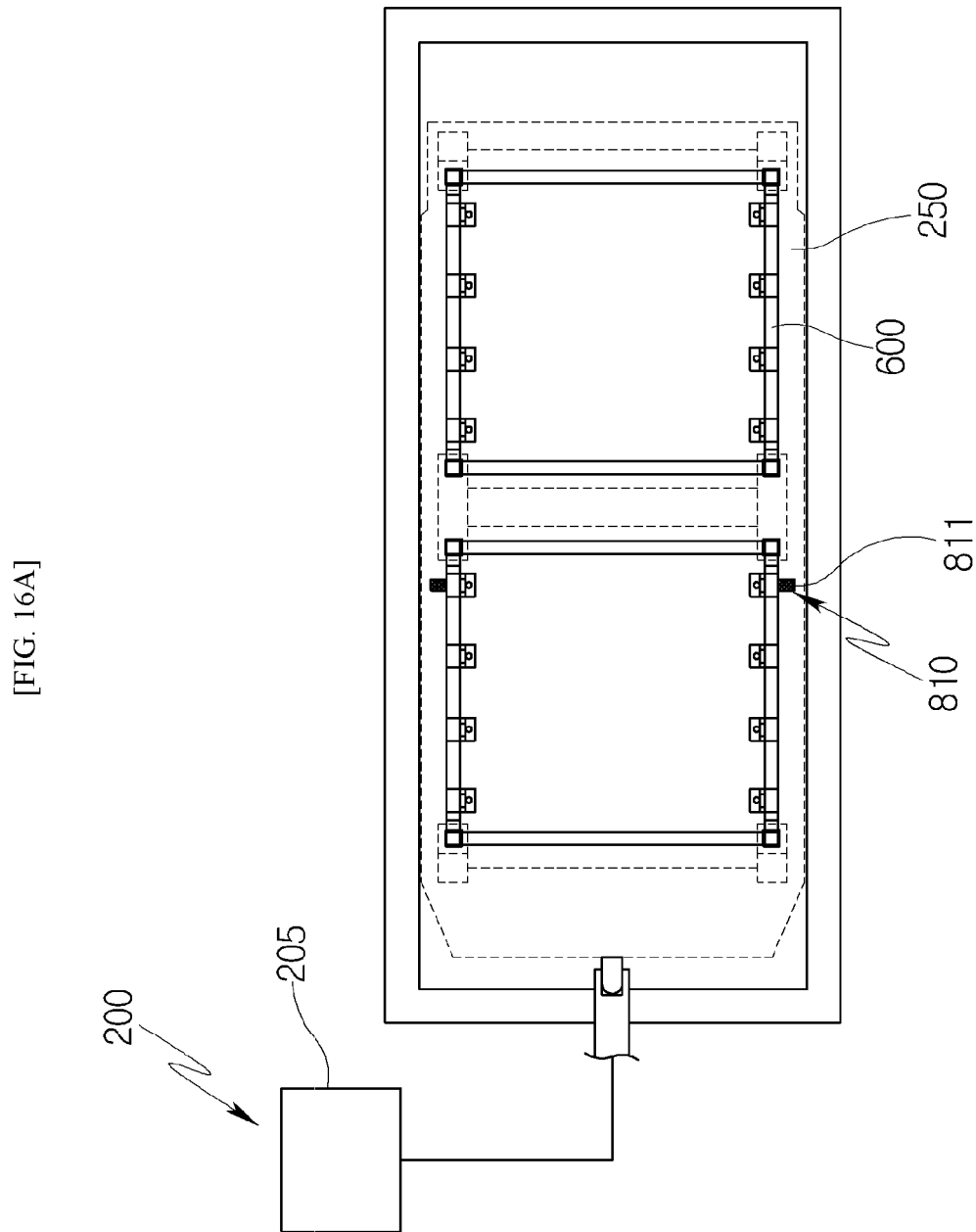
[FIG. 16A]

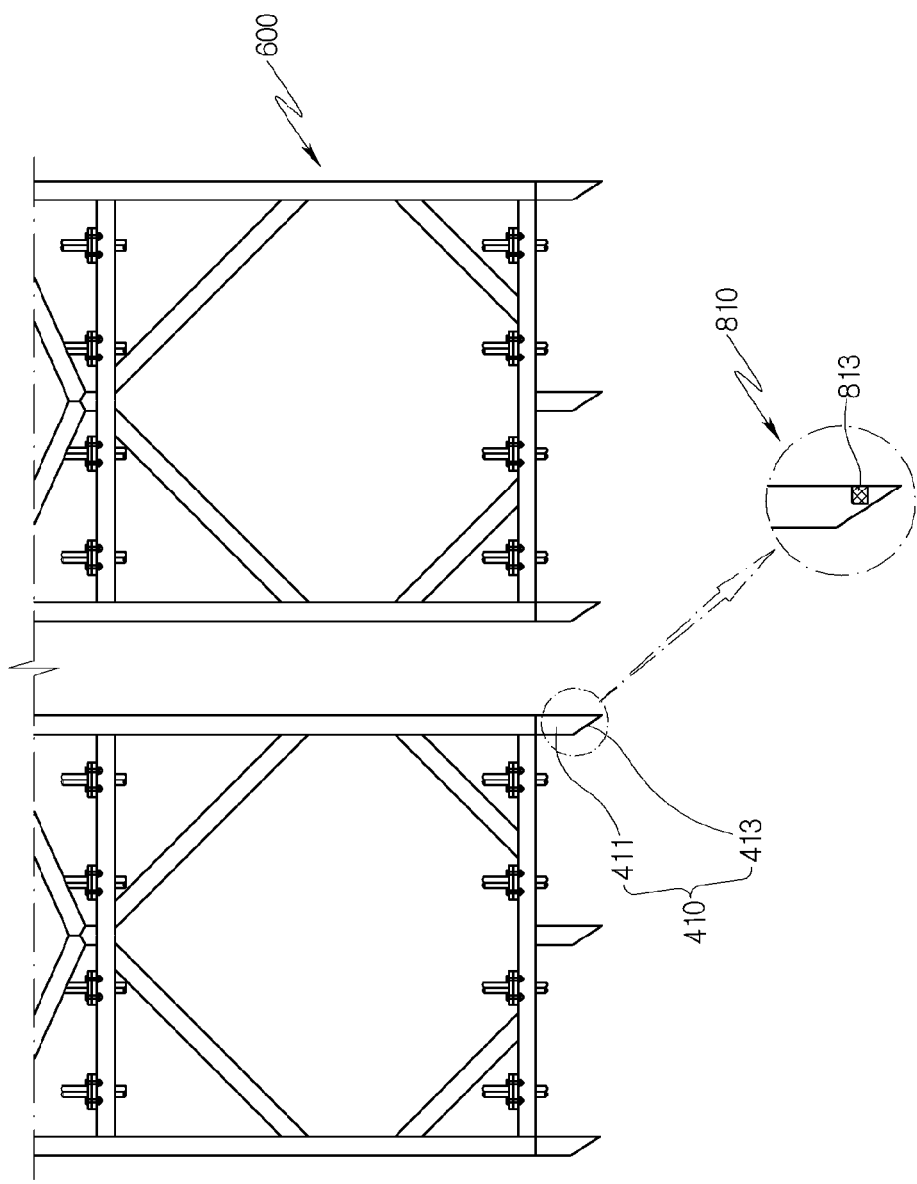

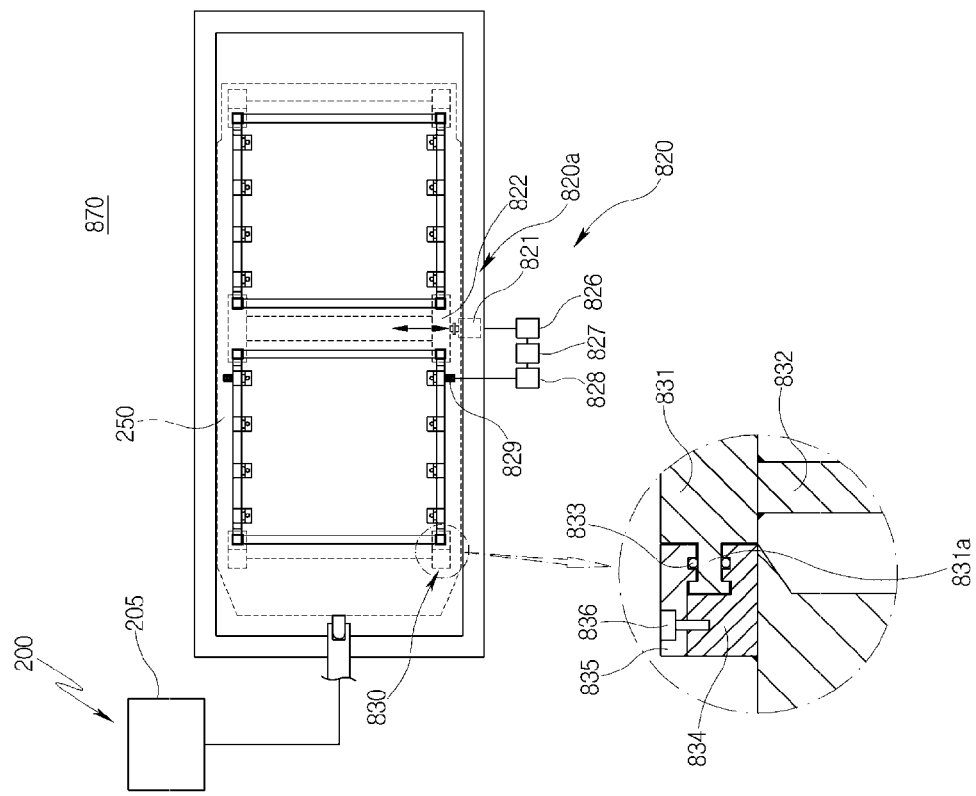
[FIG. 17]

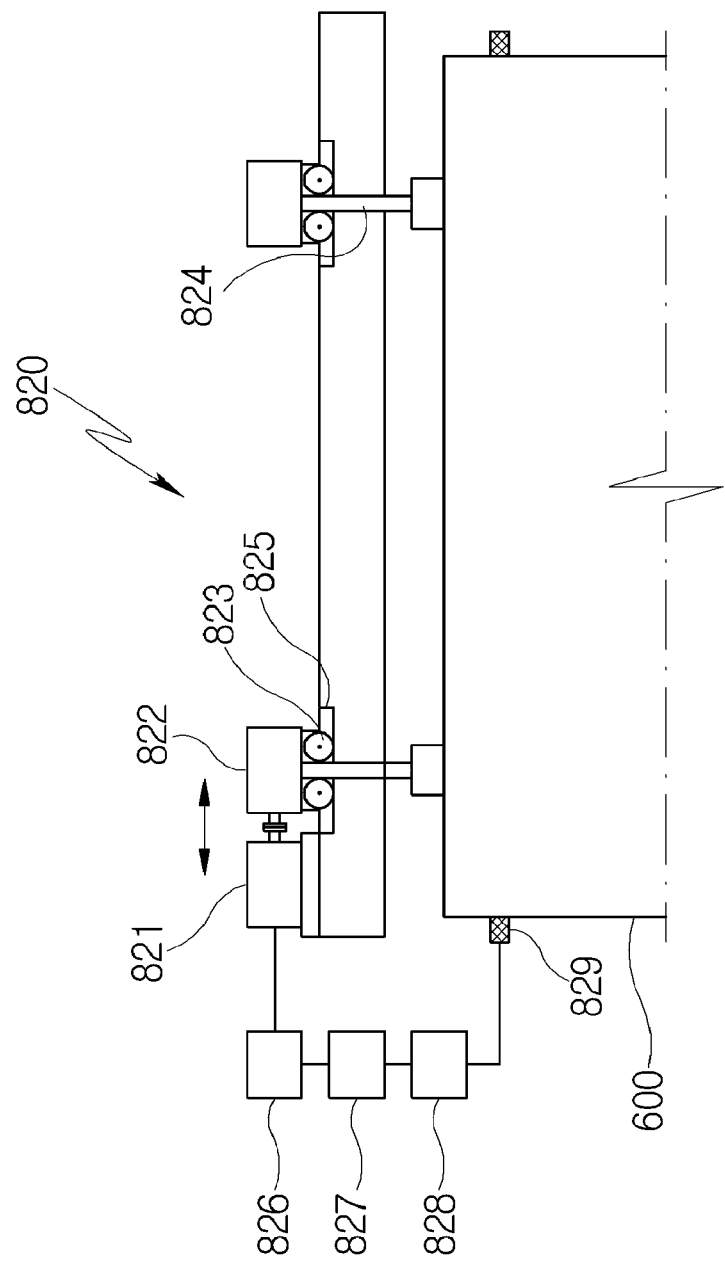

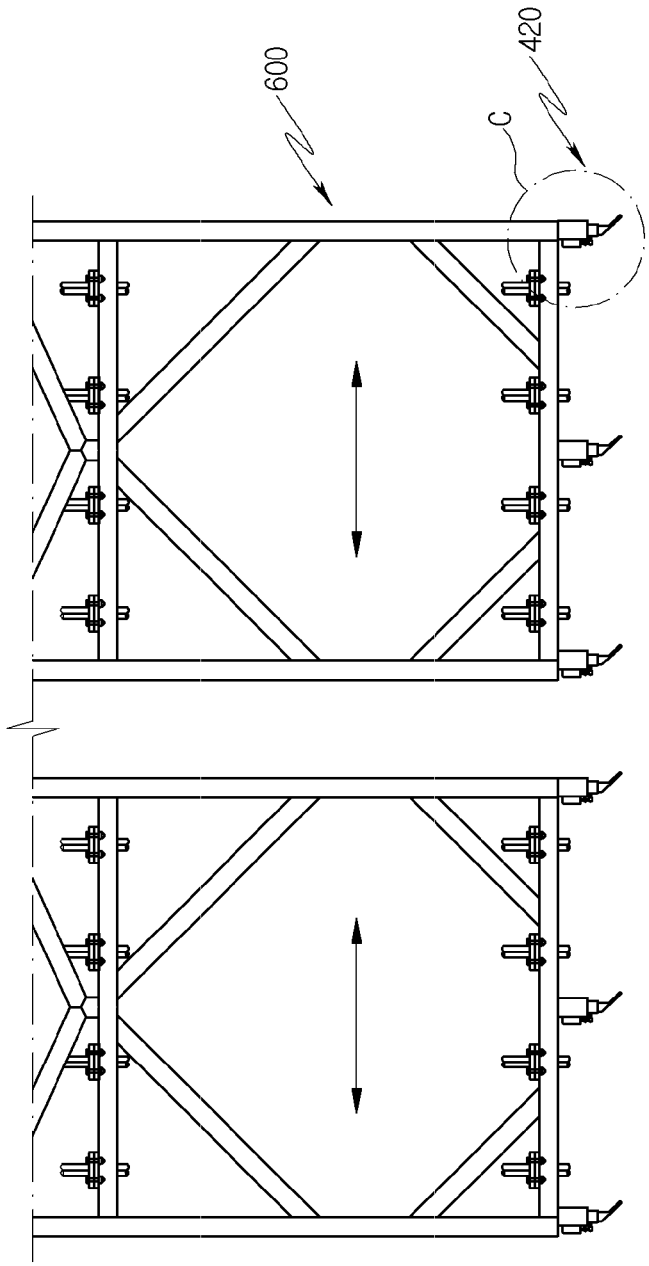
[FIG. 19]

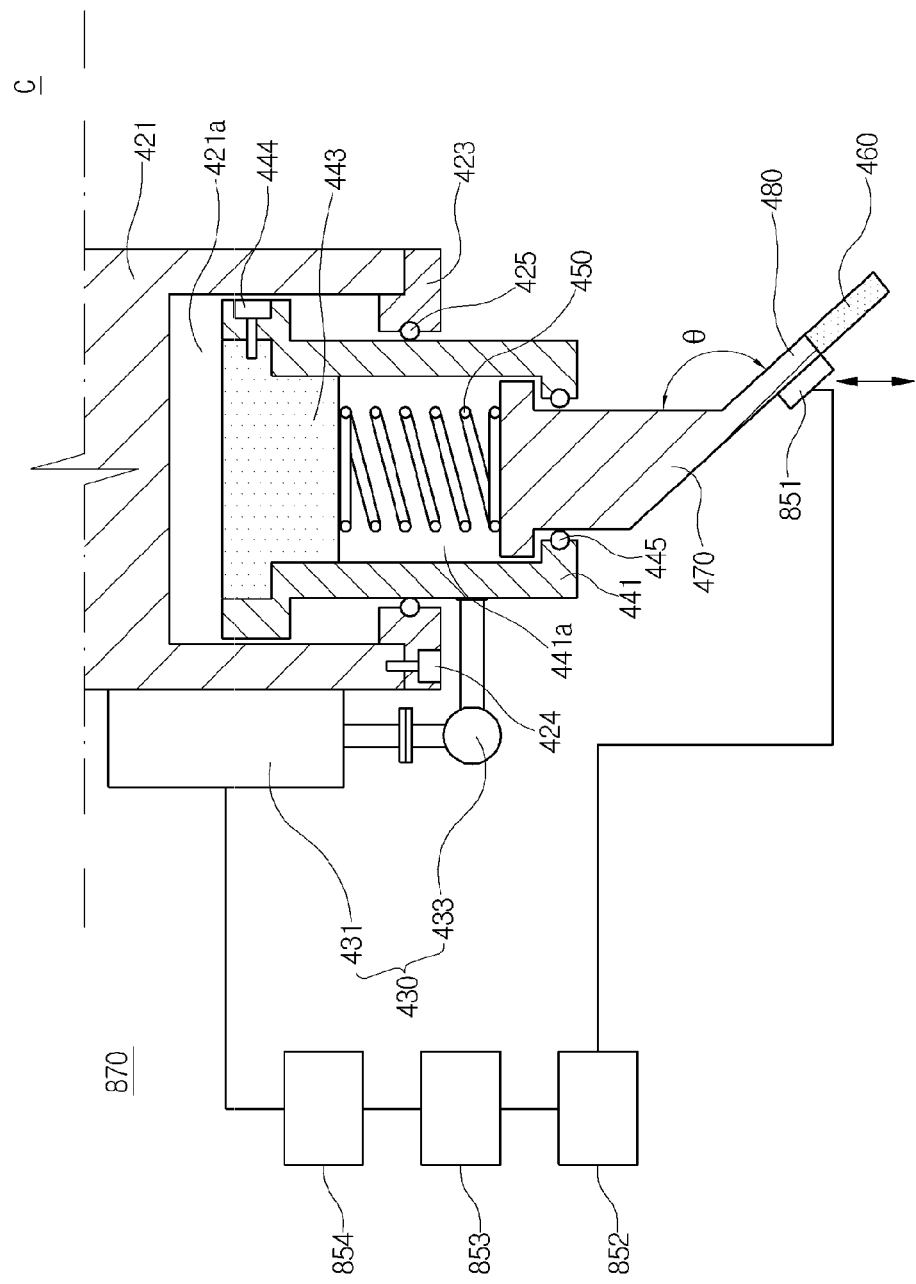
[FIG. 20]

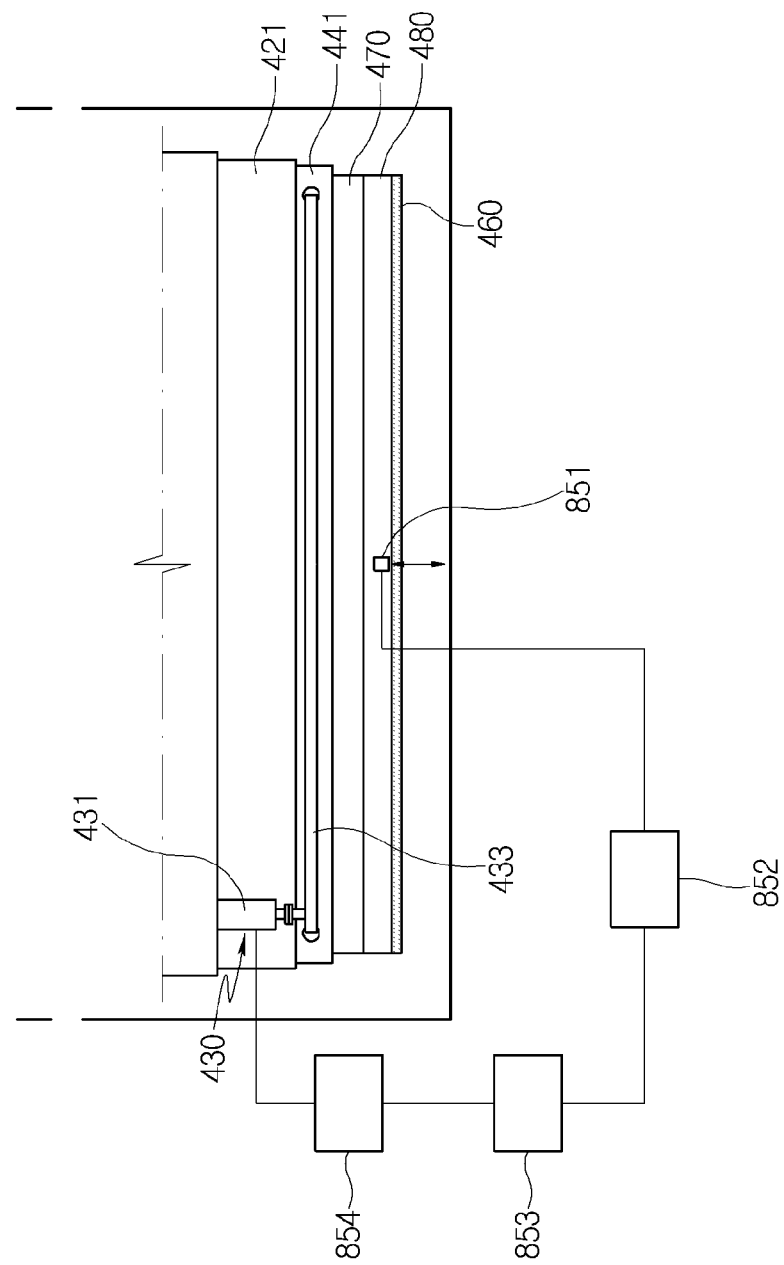

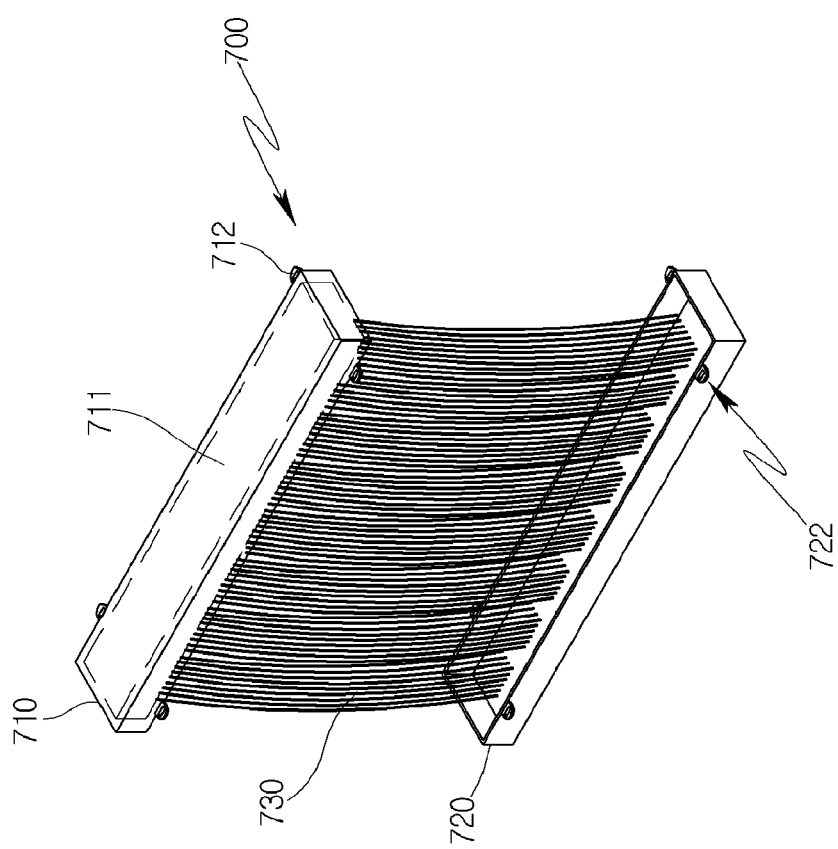
[FIG. 22]

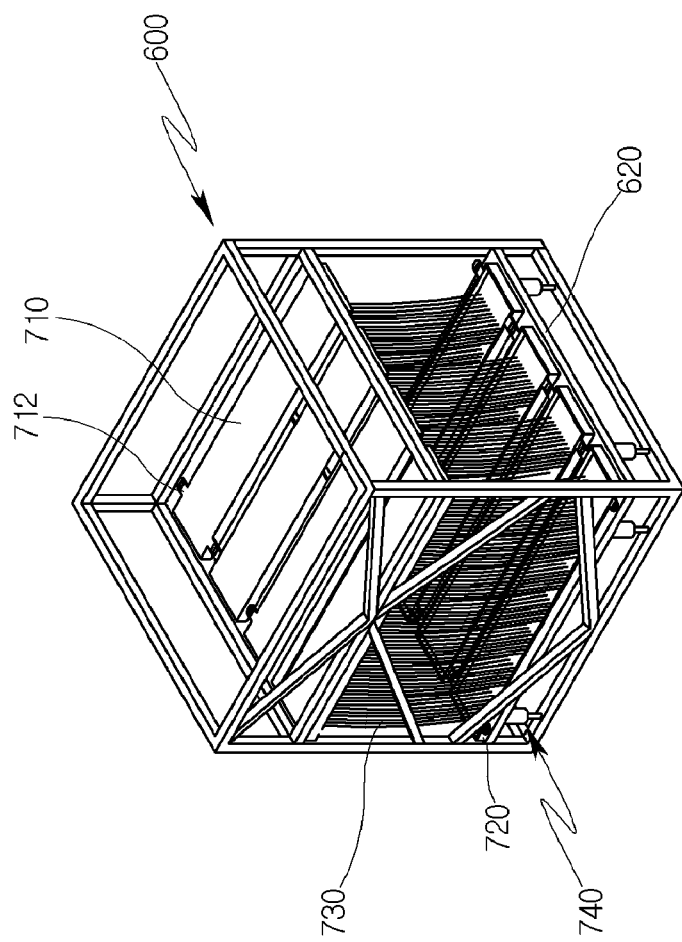
[FIG. 23]

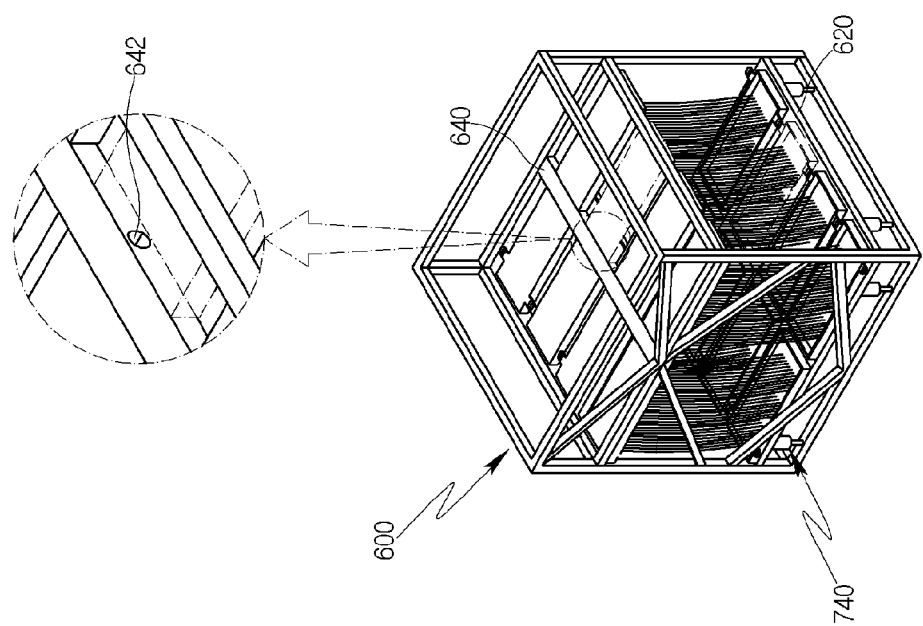
[FIG. 24]

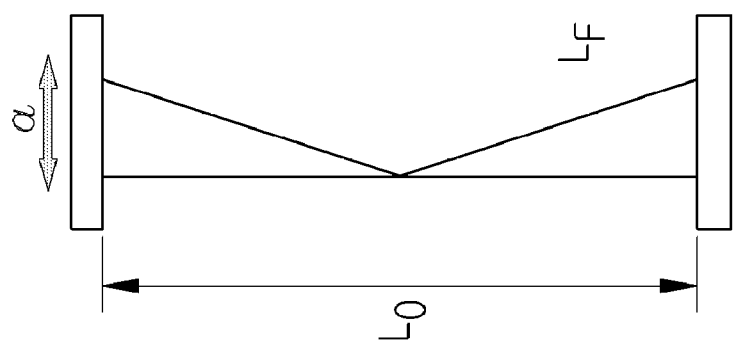
[FIG. 25]

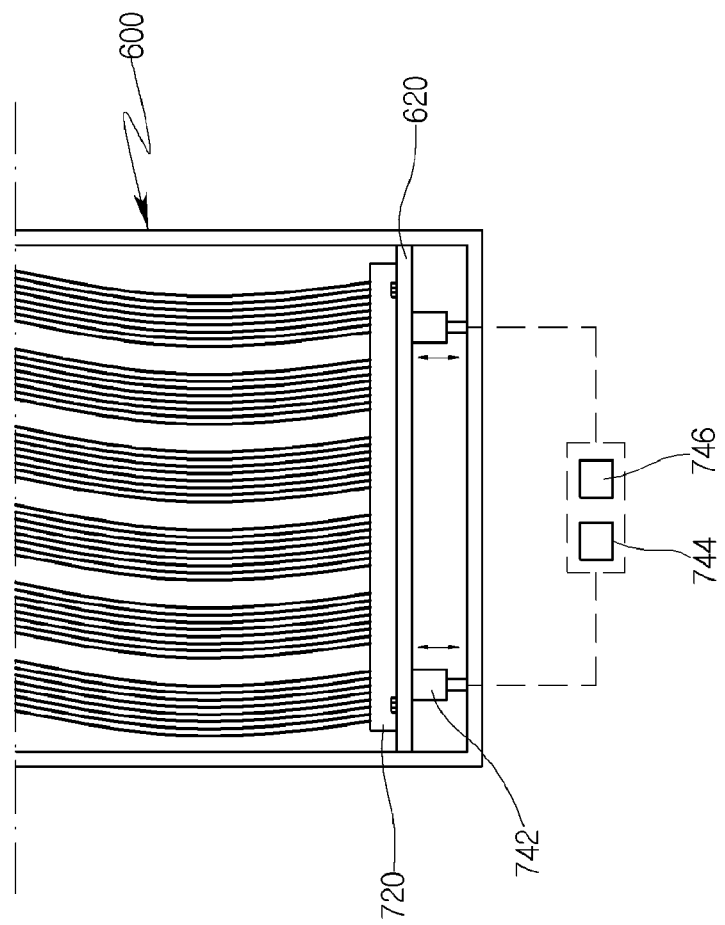
[FIG. 26]

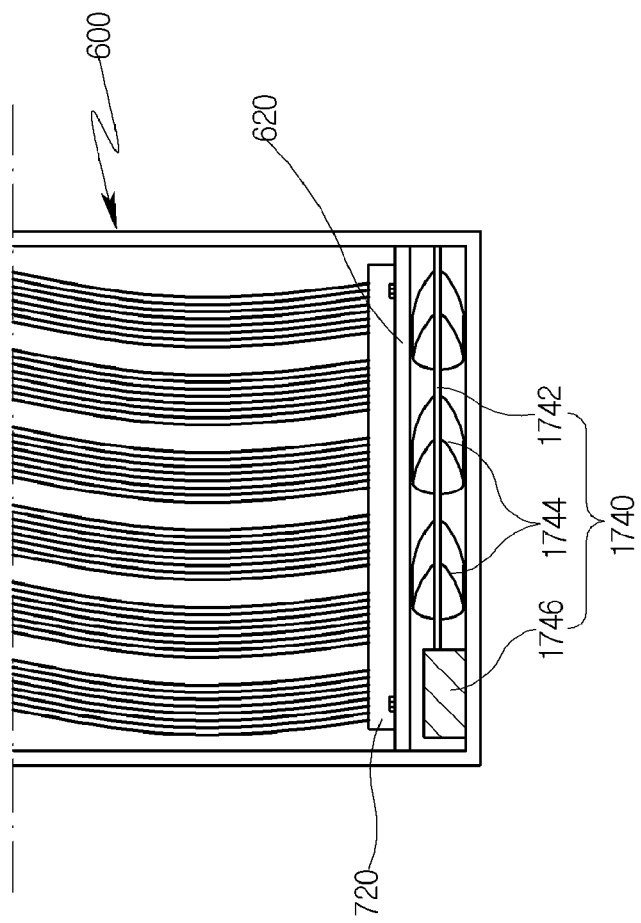

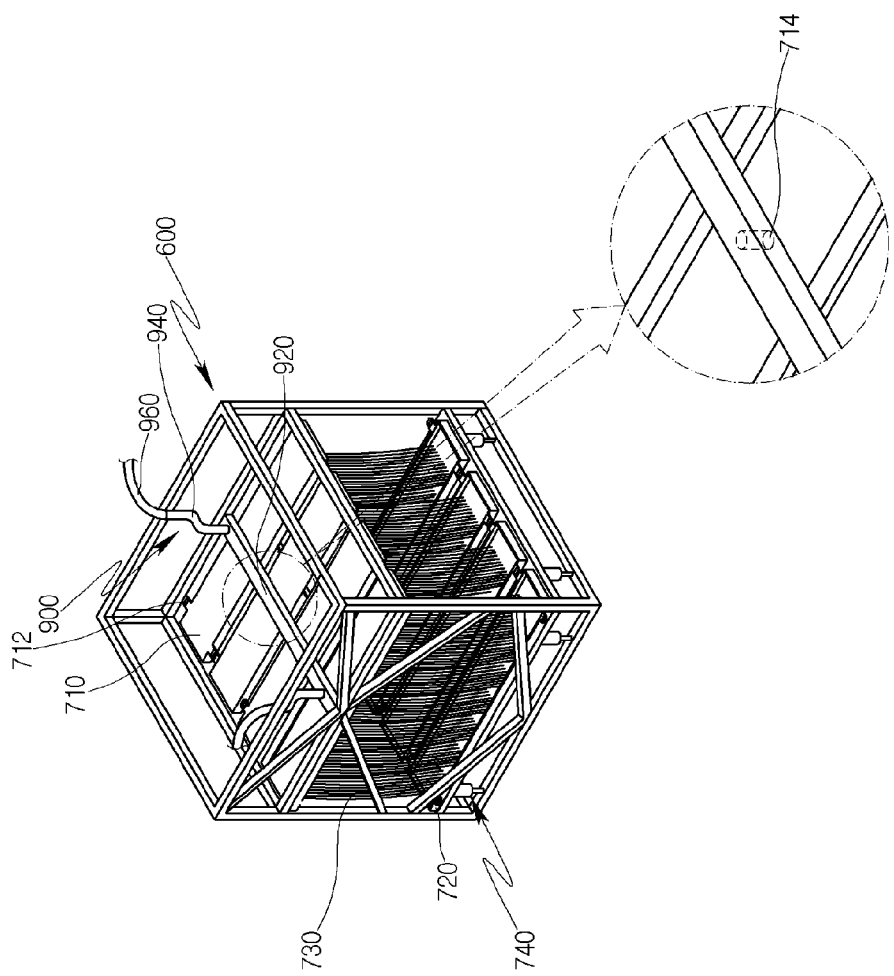
[FIG. 28]

[FIG. 29]
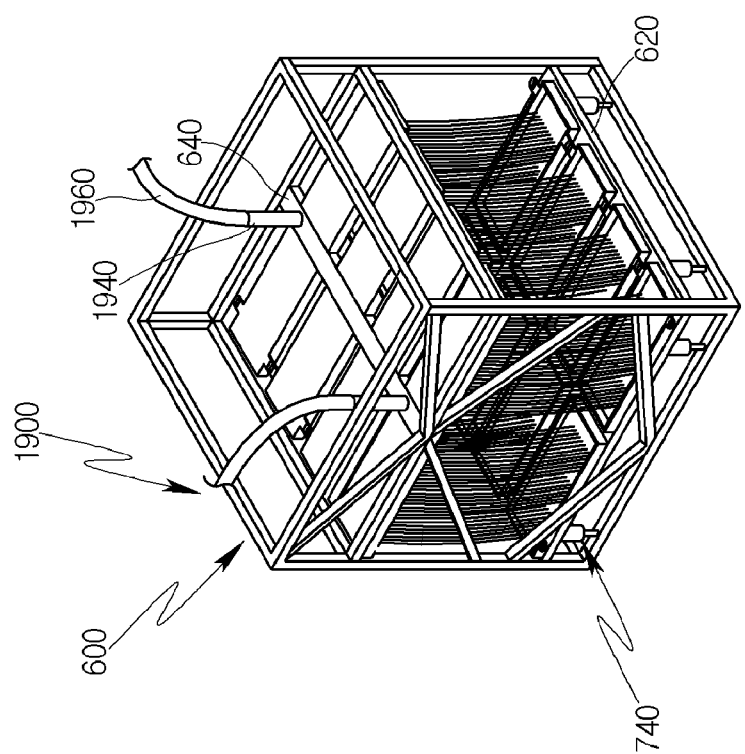

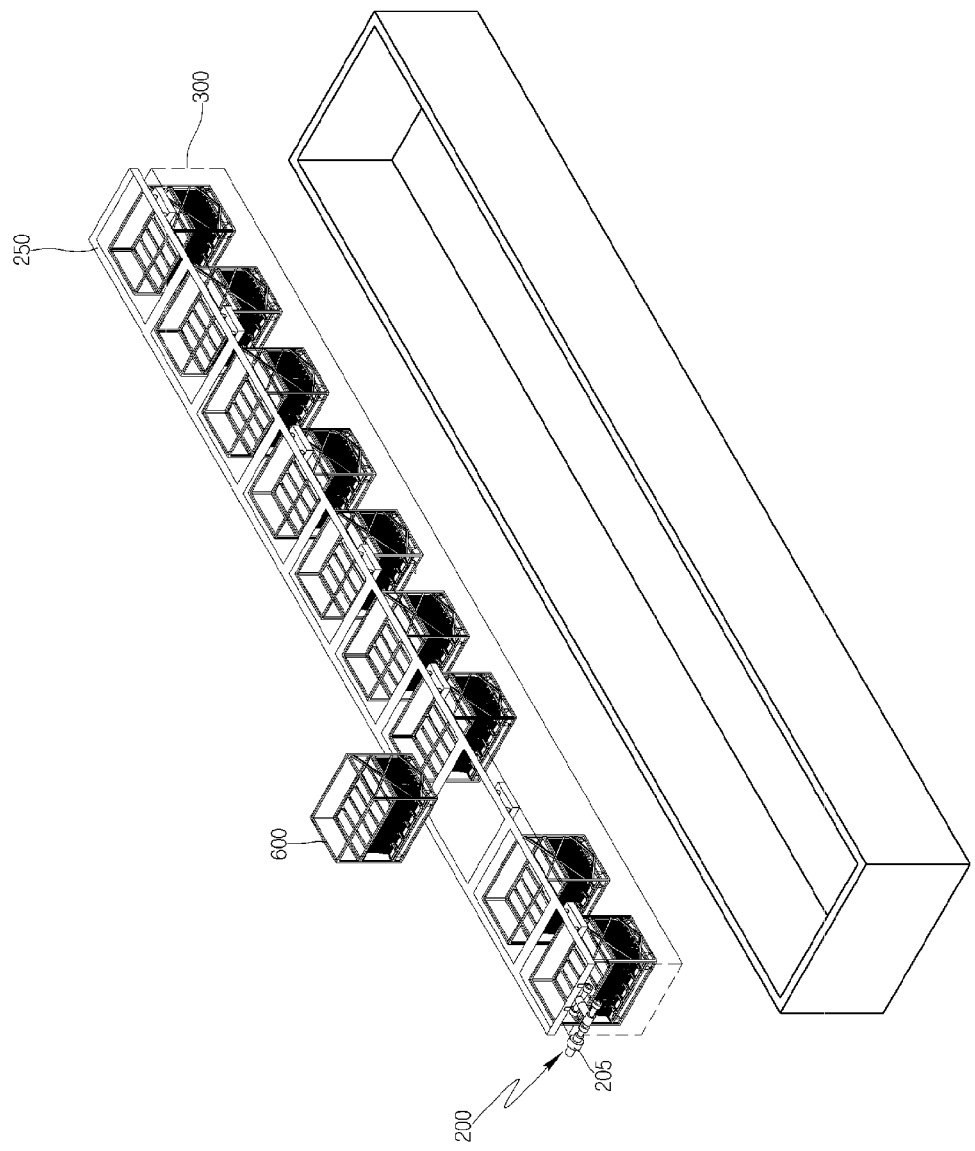
[FIG. 30]

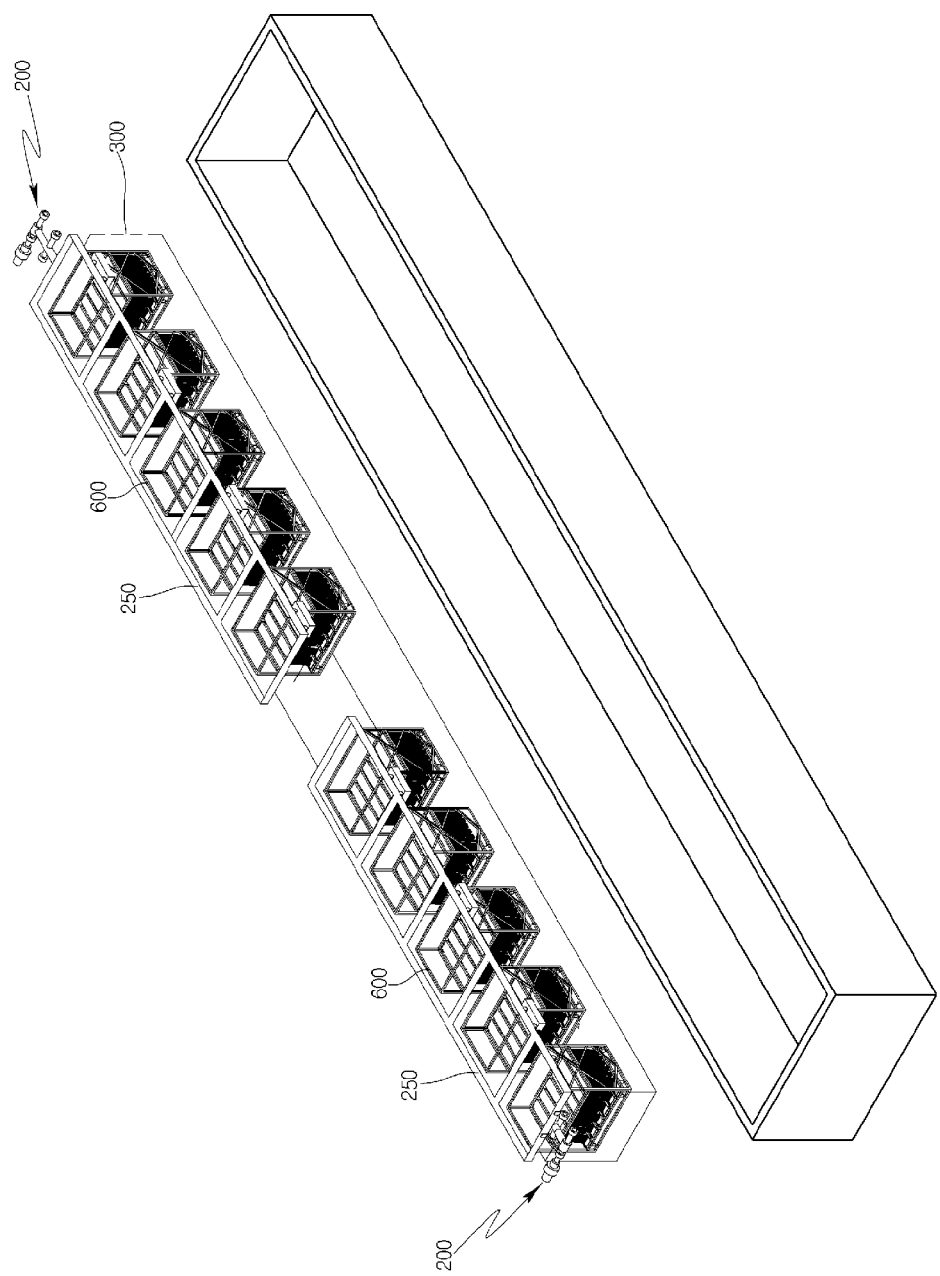
[FIG. 31]

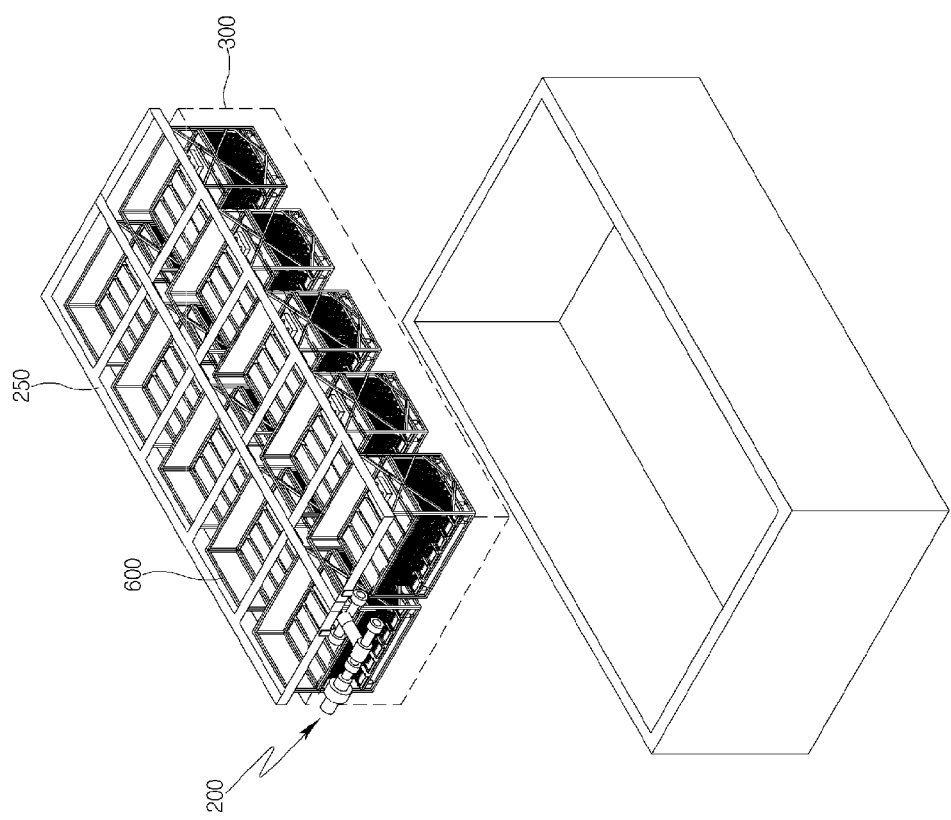
[FIG. 32]

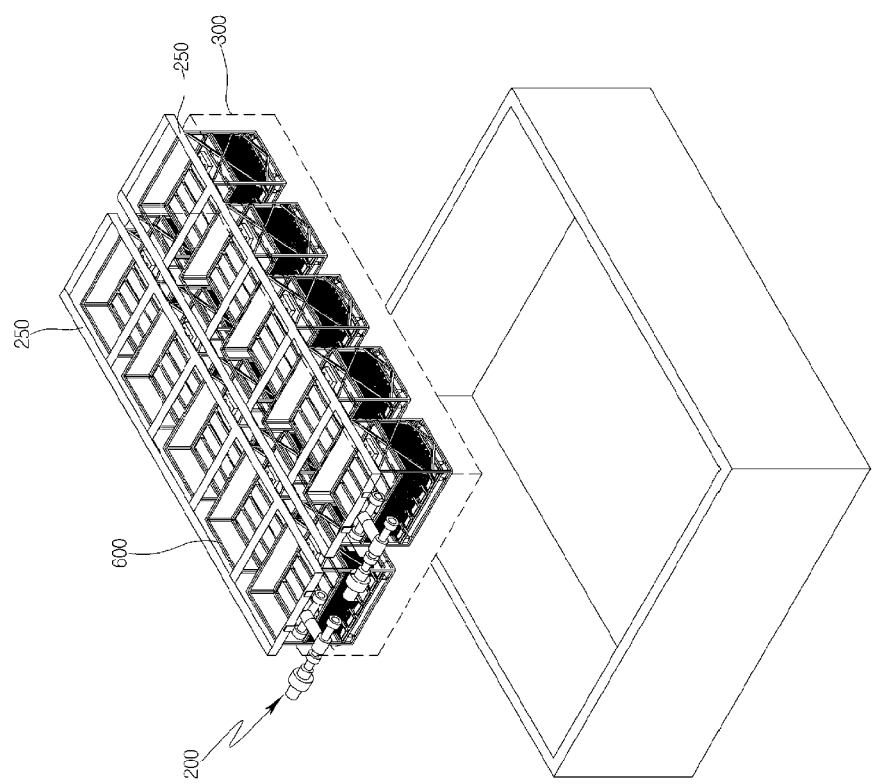
[FIG. 33]

MEMBRANE FILTRATION SYSTEM AND MEMBRANE BIO REACTOR INCLUDING THE SAME

CROSS-REFERENCE TO RELATED APPLICATIONS

This application is a continuation of U.S. application Ser. No. 15/694,302, filed on Sep. 1, 2017, which claims benefit of priority to Korean Patent Application No. 10-2016-0162327 and 10-2016-0162328 filed on Nov. 30, 2016 in the Korean Intellectual Property Office, the disclosure of which is incorporated herein by reference in its entirety.

BACKGROUND

Exemplary embodiments of the present disclosure relate to a membrane filtration system for removing foreign matter and a membrane bio reactor including the same.

In general, a separation membrane technology is a separation technology using selective permeability of polymer materials. Unlike the distillation technology, the membrane separation technology does not cause a phase change and therefore is advantageous in that it can save energy and simplify the process to save a space taken up by an apparatus. The separation membrane has been developed around a reverse osmosis membrane and has been applied to ultrafiltration, microfiltration, nanofiltration or the like.

Membrane bio reactors (MBR), which is a membrane filtration system, is a process that uses a separation membrane instead of a sedimentation tank for a final treatment stage of the existing biological treatment processes.

The MBR can increase treatment efficiency of organic substances and nitrogen components or the like by keeping a concentration of microorganisms high in a reactor and can increase efficiency of solid/liquid separation by removing suspended substances, microorganisms or the like using the separation membrane. The MBR may have many advantages of solving the problems of the existing biological treatment processes.

The MBR has a smaller required site area and better treatment efficiency than the existing return activated sludge (RAS) processes, and the use of the MBR is expected to increase to cope with an increase in a water demand due to population growth, urbanization and increasingly stringent water quality regulations.

Unlike a membrane binding treatment system used for subsequent processes of the existing secondary biological treatment facilities, a submerged membrane bio reactor generally refers to a reaction tank that can directly submerge a separation membrane module into a secondary bio reactor to perform a solid/liquid separation, which is devised to achieve a dual effect of raising water quality to a level of advanced sewage treatment simultaneously with performing the solid/liquid separation.

Meanwhile, when the separation membrane module is submerged into the bio reaction tank in most membrane bio reactors (MBR) processes, the separation membrane module corresponding to the treatment capacity is fixedly provided to a separate frame, such that the filtration by the separation membrane is subjected to an upper water-collecting process or a both end water-collecting process according to the form of the separation membrane module to discharge treated water through a filtering pipe.

However, suspended substances or the like attach to the surface of the membrane during the filtration process and block a flow of water and contaminate the membrane, thereby gradually degrading the filtration ability of the membrane bio reactor, increasing a membrane permeation pressure, and creating difficulty in washing the contaminated membrane.

Various application methods of the existing wastewater treatment technologies using a separation membrane have been researched earlier on in Europe and Japan, but have not been developed as realistic application technologies until the early 90's, due to high separation membrane cost, high energy cost or the like and membrane clogging or the like, and therefore have been restrictively applied only to the field of academic research or specific cases.

However, a method for using a separation membrane of a submerged type and a return activated sludge combined type or the like that are utilized as a means for submerging the separation membrane into the activated sludge reaction tank and suppressing the clogging of the separation membrane using an upward water flow caused by air bubbles generated during an aeration process has been proposed since the early 1990's to considerably alleviate the problem of the membrane clogging that was one of the biggest obstacles to the field application of the separation membrane technology.

As described above, conventionally, an air refining method is used to wash the membrane clogging. As one of the air refining methods, a method for removing sludge attached to a membrane w by spraying air to an outer wall of a separation membrane in an upward water flow manner has been used.

However, the air refining method has a problem that energy consumption is considerably large because it needs to be performed over the entire range of the separation membrane.

BRIEF SUMMARY

An object of the present disclosure is to provide a membrane filtration system and a membrane bio reactor including the same capable of effectively removing foreign matters attached to a separation membrane with less energy by reciprocating the separation membrane and controlling a spaced distance for anti-shock within facilities.

In accordance with one aspect of the present disclosure, a membrane filtration system includes: a treatment tank; a membrane support frame disposed in the treatment tank and mounted with a filtration membrane; a reciprocating means connected to the membrane support frame and reciprocating the membrane support frame; a sliding means disposed in the treatment tank, connected to the reciprocating means, and guiding a moving direction of the membrane support frame; and a sludge lifting means flexibly disposed at a lower end of the membrane support frame to lift sludge accumulated at a lower part of the treatment tank.

The sludge lifting means may include: a first vane body disposed at a lower end of the membrane support frame; a second vane body connected to a lower end of the first vane body; and an elevation unit disposed to interlock between the first vane body and the second vane body and elevating the second vane body.

The elevation unit may include: a hydraulic cylinder disposed on the first vane body; and an elevation rod disposed on the second vane body and connected to a rod of the hydraulic cylinder.

The sludge lifting means may further include a third vane body connected to a lower end of the second vane body.

The sludge lifting means may further include a lifting blade connected to a lower end of the third vane body to lift sludge during a reciprocating motion of the membrane support frame.

The lifting blade may be disposed to form a predetermined angle with respect to the third vane body.

The sludge lifting means may further include an elastic body disposed between the second vane body and the third vane body to alleviate an impact applied when the lifting blade collides with a bottom of the treatment tank.

The sludge lifting means may further include a shock-absorbing pad disposed at an end of the lifting blade to alleviate an impact applied when the lifting blade collides with a bottom of the treatment tank.

In accordance with another aspect of the present disclosure, a membrane filtration system includes: a treatment tank; a membrane support frame disposed in the treatment tank and mounted with a separation membrane; a sludge lifting means flexibly disposed at a lower end of the membrane support frame to lift sludge accumulated at a lower part of the treatment tank; and an interval adjusting means adjusting an interval between the membrane support frame or the sludge lifting means and the treatment tank.

The interval adjusting means may include: a first interval adjuster adjusting an interval between the membrane support frame and an inner wall of the treatment tank; and a second interval adjuster adjusting an interval between the sludge lifting means and a bottom of the treatment tank.

The membrane filtration system may further include: a reciprocating means connected to the membrane support frame and reciprocating the membrane support frame.

The reciprocating means may include a reciprocating frame interlocking with the membrane support frame, and the first interval adjuster may include: a control cylinder disposed at an upper end of the reciprocating frame; and a moving unit connected to a rod of the control cylinder, supporting the membrane support frame, and movably disposed in a width direction of the reciprocating frame.

The moving unit may include: a moving rail disposed in the width direction of the reciprocating frame; and a moving block including a rolling wheel to move along the moving rail.

The first interval adjuster may include: a first proximity sensor disposed at a side surface of the membrane support frame; a first interval calculator calculating an interval between the membrane support frame and an inner wall of the treatment tank using a signal transmitted from the first proximity sensor; a first hydraulic amount calculator converting a calculated value of the first interval calculator into a hydraulic driving value; and a first driver driving the control cylinder depending on the hydraulic driving value of the first hydraulic amount calculator.

The sludge lifting means may include: a first vane body disposed at a lower end of the membrane support frame; a second vane body connected to a lower end of the first vane body; a third vane body connected to a lower end of the second vane body; a lifting blade connected to form a predetermined angle with respect to a lower end of the third vane body to lift sludge during a reciprocating motion of the membrane support frame; and an elevation unit disposed to interlock between the first vane body and the second vane body and elevating the second vane body.

The elevation unit may include: a hydraulic cylinder disposed on the first vane body; and an elevation rod disposed on the second vane body and connected to a rod of the hydraulic cylinder.

The second interval adjuster may include: a second proximity sensor disposed on the lifting blade; a second interval calculator calculating an interval between the lifting blade and a bottom of the treatment tank using a signal transmitted from the second proximity sensor; a second hydraulic amount calculator converting a calculated value of the second interval calculator into a hydraulic driving value; and a second driver driving the hydraulic cylinder depending on the hydraulic driving value of the second hydraulic amount calculator.

The membrane filtration system may further include: a sliding means disposed in the treatment tank, connected to the reciprocating means, and guiding a moving direction of the membrane support frame.

The membrane filtration system may further include: an interval measuring unit measuring an interval between the membrane support frame or the vane member and the treatment tank, in which the interval measuring unit may include: a first interval measuring sensor measuring an interval between the membrane support frame and an inner wall of the treatment tank; and a second interval measuring sensor measuring an interval between the vane member and a bottom of the treatment tank.

In accordance with still another aspect of the present disclosure, a membrane bio reactor, includes: a biological treatment train performing at least one of anaerobic, anoxic, and aerobic biological treatment processes; and the membrane filtration system.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective view of a membrane filtration system according to an embodiment;

FIG. 2 is a side perspective view illustrating a structure of a reciprocating portion illustrated in FIG. 1;

FIG. 3 is a perspective diagram illustrating a link rod illustrated in FIG. 2;

FIG. 4 is a top view diagram illustrating a rotor illustrated in FIG. 2;

FIG. 5 is a side view of a sliding portion according to a first embodiment;

FIG. 6 is a front cross-sectional view of the sliding portion shown in FIG. 5;

FIG. 7A is a side view of a sliding portion according to a second embodiment;

FIG. 7B is a front cross-sectional view of the sliding portion shown in FIG. 7A;

FIG. 8A is a side view of a sliding portion according to a third embodiment;

FIG. 8B is a front cross-sectional view of the sliding portion shown in FIG. 8A;

FIG. 9A is a side view of a sliding portion according to a fourth embodiment;

FIG. 9B is a front cross-sectional view of the sliding portion shown in FIG. 9A;

FIG. 10 is a side perspective view of a vane member of the present invention;

FIG. 11 is an operation state diagram of the vane member illustrated in FIG. 10;

FIG. 12 is a perspective side view of a sludge lifting portion;

FIG. 13 is a side cross-sectional view of the sludge lifting portion illustrated in FIG. 12;

FIG. 14 is a rear view of the sludge lifting portion illustrated in FIG. 12;

FIG. 15 is an operation state diagram of the sludge lifting portion illustrated in FIG. 12;

FIG. 16A is a diagram illustrating an interval measurer according to an embodiment;

FIG. 16B is a diagram illustrating an interval measurer according to an embodiment;

FIG. 17 is a top view of an interval adjusting portion according to an embodiment;

FIG. 18 is a partial side view of a first interval adjuster illustrated in FIG. 17;

FIG. 19 is a partial side view of a second interval adjuster illustrated in FIG. 17;

FIG. 20 is a side cross-sectional view illustrating an interlocking between the sludge lifting portion and a second interval adjuster illustrated in FIG. 19;

FIG. 21 is a rear view illustrating interlocking between the sludge lifting portion and the second interval adjuster illustrated in FIG. 20;

FIG. 22 is a side perspective view illustrating a structure of a separation membrane module illustrated in FIG. 1;

FIG. 23 is a perspective diagram illustrating a membrane support frame according to a first embodiment;

FIG. 24 is a perspective diagram illustrating a membrane support frame according to a second embodiment;

FIG. 25 is a diagram illustrating looseness;

FIG. 26 is an enlarged view of a length adjuster according to a first embodiment;

FIG. 27 is an enlarged view of a length adjuster according to a second embodiment;

FIG. 28 is a diagram illustrating a filtered water discharger according to a first embodiment illustrated in FIG. 1;

FIG. 29 is a diagram illustrating a filtered water discharger according to a second embodiment;

FIG. 30 is a view illustrating a disposition structure of a membrane support frame according to a first embodiment;

FIG. 31 is a view illustrating a disposition structure of a membrane support frame according to a second embodiment;

FIG. 32 is a view illustrating a disposition structure of a membrane support frame according to a third embodiment; and FIG. 33 is a view illustrating a disposition structure of a membrane support frame according to a fourth embodiment.

DETAILED DESCRIPTION

Hereinafter, preferred embodiments of a membrane filtration system and a membrane bio reactor including the same according to the present disclosure will be described with reference to FIGS. 1 to 33.

Further, the following terms are provided in consideration of the functions of the present disclosure and can be changed according to a user's or operator's intention or practice and the following embodiments do not limit the scope of the present disclosure.

A part may be omitted to more clearly describe other aspects, and the same elements are designated by the same reference numerals throughout the specification. In the present specification, unless explicitly described to the contrary, "comprising" any components will be understood to include other components.

A membrane bio reactor of the present disclosure may include a biological treatment train in which at least one of anaerobic, anoxic, and aerobic biological treatment processes are carried out and a membrane filtration system in which filtration is carried out by a reciprocating membrane.

Specifically, inflow water to be treated flows into the biological treatment train, and various anaerobic, anoxic, and aerobic biological treatment processes may be carried out in the treatment train.

That is, an anaerobic treatment tank for treating inflow water in the absence of dissolved oxygen, an anoxic tank for treating inflow water under oxygen depletion conditions, an aerobic treatment tank for treating inflow water in the presence of dissolved oxygen or the like are variously arranged according to a process order, such that a series of biological treatment processes can be performed.

A mixed liquid from the biological treatment train is subjected to physical filtration by the membrane filtration system. For example, the mixed liquid passes through a separation membrane and thus solid/liquid separation can be performed, which will be described in detail below.

Further, a portion of a return activated sludge (RAS) may return to the biological treatment train to maintain a sludge concentration in the train. In particular, as described below, air refining, in some cases, may not be utilized within the membrane filtration system to reduce or remove the presence of dissolved oxygen in the activated sludge (RAS), such that the run activated sludge may return from the membrane filtration system to the anoxic tank or the anaerobic treatment tank.

The membrane filtration system may include a membrane tank separately from the biological treatment train or may be disposed in the biological treatment tank.

Hereinafter, a membrane filtration system 100 will be described in detail.

Referring first to FIG. 1, the membrane filtration system 100 includes a treatment tank 300, a membrane support frame 600, a separation membrane module 700, a reciprocating portion 200, a sludge lifter 400, a sliding portion 500, and a filtered water discharger.

The membrane filtration system 100 may further include components such as a length adjuster 740, an interval measurer 810, an interval adjusting portion 860, a controller 1000 and the like.

Although the present disclosure may be applied to various kinds of apparatuses configuring the membrane filtration system, a membrane bio reactor is discussed in particular.

The treatment tank 300 may be provided in a tank form and may include an inlet 310 into which waste water (or sewage) flows and an outlet 320 through which the treated waste water (or sewage) is discharged.

It is preferable that the inlet 310 is formed so that the inflow water may flow upwardly of the treatment tank 300. Accordingly, the inflow water flows upward from the inlet of the treatment tank 300, such that the inflow water may avoid stagnating at a lower side of the treatment tank 300 and can be more effectively filtered. The inlet 310 may be disposed on an upper side of one surface of the treatment tank 300, but while forming the inlet 310 on a lower side thereof is easier in a design, the inlet 310 may also be formed as a pipe bent from the top to bottom.

The membrane support frame 600 is disposed inside the treatment tank 300 and is a portion where the separation membrane module 700 in a membrane form is mounted. As described below, the membrane support frame 600 is connected to the reciprocating portion 200. The membrane support frame 600 integrally reciprocates together with the separation membrane module 700 by the reciprocating portion 200.

The reciprocating portion 200 may be connected to the membrane support frame 600 and may be provided to reciprocate the membrane support frame 600. The reciprocating portion 200 may include a reciprocating frame 250 and a driver 205.

The reciprocating frame 250 may be connected to the membrane support frame 600 and may be a portion supporting the membrane support frame 600. Further, the driver 205 may be disposed in the treatment tank 300 and connected to one side of the reciprocating frame 250, and may move the reciprocating frame 250. The driver 205 may include a motor 210, a first pulley 211, a second pulley 213, a rotor 230, and a link rod 220.

The motor 210 may be disposed on one side of an upper end of the treatment tank 300. The first pulley 211 may be coupled to a shaft of the motor 210, and the second pulley 213 may be connected to the first pulley 211 by a power transmission belt 212 so that it may be disposed to rotate together with the first pulley 211.

Here, the rotor 230 is connected to a rotation shaft of the second pulley 213 to rotate. The link rod 220 is connected between the rotor 230 and the reciprocating frame 250 and may be provided to change a rotating motion to a reciprocating motion.

The rotor 230, and a plurality of connectors 233 that are connected to the link rod 220 may be machined. The plurality of connectors 233 may be disposed at different distances from a center of the rotor 230.

Referring to FIG. 4, five connectors 233 are machined at different intervals (radii) from the center of the rotor 230. However, the number of connectors 233 is not necessarily limited thereto, and therefore the connectors 233 may be arranged at various numbers and intervals according to the size of the rotor 230. If a user wishes to adjust a reciprocating distance of the reciprocating frame 250, it is enough to change a part connected to the link rod 220.

For example, if the user wishes to reduce the reciprocating distance of the reciprocating frame 250, the link rod 220 may be connected to a connector 233a having a relatively narrower interval at the center of the rotor 230. In this case, since a rotating radius of the connector 233a depending on the rotation of the rotor 230 is reduced, the reciprocating distance of the link rod 220 is short, which reduces the reciprocating distance of the reciprocating frame 250.

If a user wishes to increase the reciprocating distance of the reciprocating frame 250, the link rod 220 may be connected to a connector 233b having a relatively wider interval at the center of the rotor 230. In this case, since the rotating radius of the connector 233a depending on the rotation of the rotor 230 is increased, the reciprocating distance of the link rod 220 is long, which increases the reciprocating distance of the reciprocating frame 250.

Here, the link rod 220 may include a link body 221, a first link hole 223, and a second link hole 225. The link body 221 may be provided in a long bar shape, the first link hole 223 may be provided on one side of the link body 221 and may be a portion connected to the second link hole 225, and the second link hole 225 may be disposed at the other side of the link body 221 and may be a portion connected to the reciprocating frame 250.

The plurality of first link holes 223 may be formed at equal intervals along a longitudinal direction of the link body 221. Referring to FIG. 3, four first link holes 223 are machined along the longitudinal direction of the link body 221. However, the number of first link holes is not necessarily limited thereto, and therefore the connectors may be formed at various numbers according to the size of the link body 221. If a user wants to adjust the reciprocating distance of the reciprocating frame 250, the first link hole 223 that is connected to the link rod 230 may be changed.

For example, if a user wishes to reduce the reciprocating distance of the reciprocating frame 250, the connector 233 of the rotor 230 may be fastened to the first link hole 223a relatively closer to the second link hole 225 in the link rod 220. In this case, since the reciprocating distance of the link rod 220 depending on the rotation of the rotor 230 is reduced, the reciprocating distance of the reciprocating frame 250 is also reduced.

If a user wishes to increase the reciprocating distance of the reciprocating frame 250, the connector 233 of the rotor 230 may be fastened to a link hole 223b relatively farther to the second link hole 225 in the link rod 220. In this case, since the reciprocating distance of the link rod 220 depending on the rotation of the rotor 230 is increased, the reciprocating distance of the reciprocating frame 250 is also increased.

If an outermost connector 233b of the rotor 230 is connected to the first link hole 233b, the reciprocating distance of the link rod 220 depending on the rotation of the rotor 230 is maximum, such that the reciprocating distance of the reciprocating frame 250 may be maximized.

If the first link hole 223a is connected the connector 233a nearest the center of the rotor 230, the reciprocating distance of the link rod 220 depending on the rotation of the rotor 230 is minimum, such that the reciprocating distance of the reciprocating frame 250 may be minimized.

The reciprocating motion allows the separation membrane to continuously flow during filtration of sludge, such that the sludge is separated by inertia, thereby performing the washing of the separation membrane. This ultimately reduces or prevents the membrane from being clogged, thereby maintaining the efficiency of the system.

Further, since the reciprocating distance of the reciprocating frame 250 can be adjusted as described above, the reciprocating distance (amplitude) can be efficiently adjusted according to the contamination of the separation membrane module 700 based on a transmembrane pressure (TMP) measurement and the energy ma be more efficiently saved. This will be described in more detail in the following control method.

The sliding portion 500 may be disposed in the treatment tank 300 and connected to the reciprocating portion 200, and may be provided to guide the moving direction of the membrane support frame 600. The sliding portion 500 may be presented in at least four forms. Hereinafter, the respective embodiments will be described.

First Embodiment

FIGS. 5 and 6 are views illustrating the sliding portion 500 according to the embodiment illustrated in FIG. 1.

Referring to FIGS. 5 and 6, the sliding unit 500 according to the first embodiment include a guide rail 511 and a rolling member 515. The guide rail 511 may be fastened or welded in a pair to both sides of the treatment tank 300 along the longitudinal direction of the treatment tank 300 by a bolt or welding, and a cross section of the guide rail 511 may be machined to have a rectangle.

The rolling member 515 is disposed at a lower end of the reciprocating frame 250 and may be seated on an upper end of the guide rail 511. The rolling member 515 may include a wheel block 513 and a rolling wheel 514. The wheel block 513 may be fastened or welded to the lower end of the reciprocating frame 250 by a bolt 513a or welding and a rotation shaft 514b of the rolling wheel 514 may be rotatably mounted on the wheel block 513 while being inserted into a through hole 513a of the wheel block 513.

Here, the rolling wheel 514 may include a center wheel part 514a and a support wheel part 514c. The center wheel part 514a is a part that is seated on the guide rail 511 and supports a load of the reciprocating frame 250. The support wheel part 514c is a part extending to a side surface of the guide rail 511 so that the reciprocating frame 250 does not move laterally. By doing so, the rolling wheel 514 is not separated from the guide rail 511 during the reciprocating motion, and thus may move relatively stably.

Stoppers 512 may be disposed on both ends of the guide rail 511 to keep the rolling wheel 514 from being separated.

Second Embodiment

FIGS. 7A and 7B are diagrams illustrating the sliding portion 500 according to a second embodiment.

Referring to FIGS. 7A and 7B, the sliding unit 500 according to the second embodiment include a guide rail 521 and a rolling member 525. The guide rail 521 may be fastened or welded in pair to both sides of the treatment tank 300 along the longitudinal direction of the treatment tank 300 by a bolt or welding, and may be machined to have a shape tapered inwardly from the outside.

The rolling members 525 may be disposed at both sides of the lower end of the reciprocating frame 250 and may include a wheel support 523 and a tapered wheel 524. The wheel support 523 may be fastened or welded to the lower end of the reciprocating frame 250 by a bolt 523a or welding. A rotation shaft 524a of the taper wheel 524 is fitted in the through hole 523a of the wheel support 523 and is rotatably connected thereto and may be tapered outward from a central side.

The tapered shape of the guide rail 521 and the tapered shape of the rolling member 525 correspond to each other, and therefore the rolling member 525 is stably seated on the upper end of the guide rail 521 to smoothly move the reciprocating frame 250. At this time, stoppers 522 may be disposed on both ends of the guide rail 524 to prevent the keep wheel 524 from being separated.

Third Embodiment

FIGS. 8A and 8B are diagrams illustrating the sliding portion 500 according to a third embodiment.

Referring to FIGS. 8A and 8B, the sliding portion 500 according to the third embodiment may include a linear guide 531, a ball bearing 534, and a moving beam 533. The linear guides 531 may be fastened or welded to both sides of the treatment tank 30 along the longitudinal direction by a bolt or welding. The ball bearing 534 may be disposed on a part where the moving beam is seated over the linear guide 531.

The moving beam 533 may be fastened or welded to the lower end of the reciprocating frame 250 by a bolt 533a or welding and seated on the linear guide 531. If the reciprocating frame 250 reciprocates by the driver 205, the moving beam 533 moves on the linear guide 531. The moving beam 533 moves while seated on an inner groove 531a of the linear guide 531, and therefore stably moves without being separated to the outside.

Further, stoppers 532 may be disposed on both ends of the linear guide 531 to keep the moving beam 533 from being excessively separated.

Fourth Embodiment

FIGS. 9A and 9B are diagrams illustrating the sliding portion 500 according to a fourth embodiment.

Referring to FIGS. 9A and 9B, the sliding portion 500 according to the fourth embodiment may include a guide rail 551, a wheel block 561, a rolling wheel 571, and a support unit 580.

The guide rail 551 may be fastened or welded to both sides of an upper end of the treatment tank 300 along the longitudinal direction by a bolt 554 or welding. The guide rail 551 may be machined to be in an H beam shape and an upper edge portion of the guide rail 551 may be provided with a first protrusion 552 extending in the downward direction and linearly extending along the guide rail 551.

The wheel block 561 may be fastened or welded to the lower end of the reciprocating frame 250 by a bolt 562 and welding and the rolling wheel 571 may be rotatably mounted on the wheel block 561.

Specifically, the rotation shaft 573 of the rolling wheel 571 may be inserted into a through hole 566 of the wheel block 561 and a wheel cap 574 may be fastened by a bolt 575 to be rotatably connected to the wheel block 561. The bearing 565 may be disposed on the wheel block 561 to smoothly rotate the rolling wheel 571, and a shaft cover 563 may be fastened by a bolt 564 to be fixed.

The rolling wheel 571 may be formed in a disc shape, and a second protrusion 572 protruding toward a center of the rolling wheel 571 may be formed on an outer circumferential surface thereof along a circumferential direction.

Here, the support unit 580 may interlock between the rolling wheel 571 and the guide rail 551 so that the rolling wheel 571 is not separated from the guide rail 551. The support unit 580 may include a first body portion 581, a second body portion 583, a first support wheel 582, and a second support wheel 584.

The first body portion 581 may be a part that is inserted into the linear first protrusion 552 of the guide rail 551. The first support wheel 582 is disposed inside the first body portion 581 and the first support wheel 582 is rolled along the first protrusion 552 and linearly moves.

At this time, a rotation wheel 582a of the first support wheel 582 is mounted on a wheel body 582b, and the wheel body 582b may be fastened to an inside of the first body portion 581 by a bolt 582c to be fixed.

The second body portion 583 may be a part that is inserted into the second protrusion 572 of the rolling wheel 571. The second support wheel 584 is disposed inside the second body portion 583 and the second support wheel 584 is rolled on the second protrusion 572 according to the rotation of the rolling wheel 571.

At this time, a rotation wheel 584a of the second support wheel 584 is mounted on a wheel body 584b, and the wheel body 584b may be fastened to an inside of the second body portion 581 by a bolt 584c to be fixed.

The first body portion 581 and the second body portion 583 may be fastened by a bolt 586 to be connected to each other. In this case, since the first body portion 581 and the second body portion 583 each support the first protrusion 552 and the second protrusion 572 so that the protrusion 552 and the second protrusion 572 comes into close contact with each other, the rolling wheel 571 may adhere on the guide rail 551 to move without being separated.

Based on the above-described embodiments, the sliding portion 500 can more stably and smoothly move when the membrane support frame 600 linearly moves by the reciprocating portion 200, thereby saving energy and improving the fluidity of the separation membrane.

Hereinafter, the sludge lifter 400 will be described. It is possible to reduce or prevent sludge from stagnating and accumulated inside the treatment tank 300 by including the separate sludge lifter 400. As a result, the filtration action by the separation membrane module can be easily performed.

First Embodiment

According to the first embodiment, the sludge lifter 400 may be formed of a vane member 410 and will be described with reference to FIGS. 10 and 11. FIG. 10 is a side view illustrating the vane member, and FIG. 11 is an operation state diagram of the vane member illustrated in FIG. 10.

The vane member 410 may be disposed at the lower end of the membrane support frame 600 and may be provided to lift the sludge accumulated in the lower part of the treatment tank 300. The vane member 410 may include a vane body 411 and a lifting blade 413.

The vane body 411 may be disposed at a lower end of the membrane support frame 600, and a plurality of vane bodies 411 may be attached in a width direction of the membrane support frame 600. Referring to FIG. 10, three vane bodies may be mounted on the lower end of the membrane support frame 600. However, the number of vane bodies 411 may be changed depending on the viscosity of sludge, the amount of sludge or the like.

For example, when the viscosity of sludge is high and thus a strong swirl for lifting is needed and when a large amount of sludge is accumulated and thus the lifting is greatly needed, a user may increase the number of vane bodies 411 attached to the lower end of the membrane support frame 600. As the number of vane bodies 411 is increased, the number of lifting blades 413 coupled thereto is also increased correspondingly.

The lifting blade 413 may be connected to the lower end of the vane body 411 at a predetermined angle so that the sludge may lift during the reciprocating motion of the membrane support frame 600. The angle may be 150 degrees but is not limited thereto, and therefore the angle may be variously set depending on a distance from the bottom of the treatment tank 300, a thickness of a sludge layer or the like.

Referring to FIG. 11, if the membrane support frame 600 reciprocates, the lifting blade 413 swirls the sludge accumulated at the lower end of the treatment tank 300 while moving in the reciprocating motion direction of the membrane support frame 600.

As a result, the sludge is lifted and filtered by the separation membrane module 700.

Second Embodiment

According to the second embodiment, the sludge lifter 400 may be formed of a sludge lifting portion 420 and will be described with reference to FIGS. 12-15. FIG. 12 is a side view of a sludge lifting portion, FIG. 13 is a side cross-sectional view of the sludge lifting portion illustrated in FIG. 12, FIG. 14 is a rear view of the sludge lifting portion illustrated in FIG. 12, and FIG. 15 is an operation state diagram of the sludge lifting portion illustrated in FIG. 12.

The sludge lifting portion 420 may be flexibly disposed at the lower end of the membrane support frame 600 to lift the sludge accumulated at the lower part of the treatment tank 300. The sludge lifting portion 420 may be include a first vane body 421, a second vane body 441, a third vane body 470, an elevation unit 430, a lifting blade 480, an elastic body 450, and a shock-absorbing pad 460.

The first vane body 421 may be mounted on the lower end of the membrane support frame 600. Further, the second vane body 441 may be connected to the lower end of the first vane body 421. Specifically, a first space 421a is machined inside the first vane body 421, and a part of the second vane body 441 is disposed in the first space 421a so as to be movable in a vertical direction. At this time, the first cover 423 is fastened by the bolt 424 to be fixed, and a first sealing pad 425 may adhere between an inner surface of the first cover 423 and an outer surface of the second vane body 441 to reduce or prevent a fluid from being introduced.

The elevation unit 430 may be interlocked between the first vane body 421 and the second vane body 441 and may be provided to move the second vane body 441 up and down. The elevation unit 430 may include a hydraulic cylinder 431 and an elevation rod 433. The hydraulic cylinder 431 may be fastened or welded to one surface of the first vane body 421 by the bolt or the welding. Further, the elevation rod 433 may be fastened or welded to a rod of the hydraulic cylinder 431 by the bolt or the welding, and referring to FIGS. 13 and 14, it can be seen that the elevation rod 433 may be mounted along the longitudinal direction of the second vane body 441.

If a user drives the hydraulic cylinder 431, the elevation rod 433 moves up and down to adjust a vertical position of the lifting blade 480. This selects an appropriate position to effectively lift the sludges accumulated at the bottom of the treatment tank 300 without the lifting blade 480 colliding with the bottom of the treatment tank 300.

Next, the third vane body 470 is connected to the lower end of the second vane body 441. As illustrated in FIG. 13, a part of the third vane body 470 is elevatably disposed in a second space 441a machined in the second vane body 441 and an inner surface of the second vane body 441 and an outer surface of the third vane body 470 may be provided with a second sealing pad 455 to reduce or prevent a fluid from being introduced.

The lifting blade 480 may be connected to the lower end of the third vane body 470 to lift the sludge during the reciprocating motion of the membrane support frame 600. Further, the lifting blade 480 may be disposed at a predetermined angle with respect to the third vane body 470. The angle may be 150 degrees but is not necessarily limited thereto, and therefore the angle may be variously set depending on the distance from the bottom of the treatment tank 300, the thickness of the sludge layer or the like.

Further, the elastic body 450 may be disposed between the second vane body 441 and the third vane body 470 to alleviate an impact applied when the lifting blade 480 collides with the bottom of the treatment tank 300. Specifically, the elastic body 450 may be disposed in the second space 441a of the second vane body 441 and may be covered with a second cover 443 and fastened by a bolt 444 to be fixed. A lower side of the elastic body 450 comes into contact with an upper side of the third vane body 470.

If the lifting blade 480 comes into contact with the bottom of the treatment tank 300, the lifting blade 480 is applied with an impact force in the upward direction due to the collision. At this time, the third vane body 470 is lifted by the elastic body 450, thereby alleviating the impact force.

Meanwhile, an end of the lifting blade 480 may be provided with the shock-absorbing pad 460 to alleviate the shock applied when the lifting blade 480 collides with the bottom of the treatment tank 300. The shock-absorbing pad 460 may be made of elastic materials such as rubber, silicon, and plastic.

The function of the shock-absorbing pad 460 is that the shock-absorbing pad 460 is first impacted before the lifting blade 480 collides with the bottom of the treatment tank 300 and is bent by an elastic force to first offset the impact force applied to the lifting blade 480.

That is, when the lifting blade 480 collides with the bottom of the treatment tank 300, the shock-absorbing pad 460 primarily alleviates the impact by the elastic material, and the elastic body 450 elevates the third vane body 470 to secondarily alleviate the impact. This ultimately reduces or prevents the lifting blade 480 from being damaged.

FIG. 15 illustrates the operation state of the sludge lifting means 420. Referring to FIG. 15, the sludge lifting portion 420 mounted on the lower end of the membrane support frame 600 reciprocates while the membrane support frame 600 reciprocates, the sludge lifting portion 420 to generate a swirl, thereby confirming the lifted state of the sludge.

At this time, even if the lifting blade 480 excessively approaches the bottom of the treatment tank 300, the shock-absorbing pad 460 primarily alleviates an impact, and the elastic body 450 secondarily alleviates the impact force transmitted to the third vane body 470 by the lifting blade 480 to reduce or prevent facilities from being damaged during the operation.

The separation membrane module 700 may be formed in any one of a spiral wound type, a tubular type, a hollow fiber type, and a plate and frame type. In particular, the hollow fiber type is a hollow tube type that has a diameter of 0.2 to 2 mm. The hollow fiber membrane is preferably formed of a hollow fiber membrane because a membrane area ratio per unit volume of the hollow fiber is very large as compared with other types and has high productivity.

Accordingly, in the present embodiment, a bundle of hollow fiber membranes forms the separation membrane module 700. A pressing method for filtering the hollow fiber separation membrane outwardly from an inside of the hollow fiber membrane and a method for sucking the hollow fiber membrane in an opposite direction thereto may be used. There is an external type of circulating the hollow fiber membrane and a submerged type of directly submerging the module in the bio reactor of the activated sludge method for treatment of wastewater and sewage. In the present embodiment, description will be made on the basis of a method for sucking filtered water inwardly from the outside of the separation membrane module 700 and a method for directly submerging the separation membrane module 700 into the treatment tank 300.

Describing in detail the separation membrane module 700 with reference to FIG. 22, the separation membrane module 700 includes an upper frame 710 and a lower frame 720 and a plurality of hollow fiber membranes formed in a bundle between the upper frame 710 and the lower frame 720 and fixedly installed.

The upper frame 710 and the lower frame 720 are symmetrically formed in the same shape, and may also be formed in various shapes. In the present embodiment, the upper frame 710 and the lower frame 720 have a long rectangular shape.

The hollow fiber membranes 730 are each fixed to both ends of the upper frame 710 and the lower frame 720. The hollow fiber membrane 730 may be inserted so that a water collecting portion 711 formed inside the upper frame 710 and hollows of each hollow fiber membrane 730 may communicate with each other. Accordingly, the filtered water that is sucked inwardly from the outside of the hollow fiber membrane 730 and is filtered may be collected into the water collecting portion 711. This will be described in detail when the following filtered water discharger is described.

Further, both ends of the hollow fiber membrane are each fixed to the upper frame and the lower frame. However, according to another embodiment, the hollow fiber membrane is fixedly installed between the upper frame and the lower frame and both ends of the hollow fiber membrane are fixed to the upper frame and may also have a U-letter form by being wound by a fixed bar provided on the lower frame. For example, the fixed bar may be a bar having a space installed at a center thereof, in which the hollow fiber membrane may penetrate through the space.

At this time, the hollow fiber membrane 730 is densely formed like a curtain along a longitudinal direction of the frame. Further, the hollow fiber membranes 730 may be formed to have bundles for each predetermined length and may be installed to be spaced apart from each other at a predetermined distance for each bundle. This is to allow water to flow well by giving a little spaced distance because water is stagnated and fouling become worse if the separation membrane is formed too densely along the longitudinal direction.

As described below, the plurality of the separation membrane modules 700 having the above configuration may be disposed inside the membrane support frame 600. The interval between the respective separation membrane modules 700 is too narrow or there is no interval therebetween, and water is stagnated between the respective modules to make fouling more severe. Therefore, the density of the separation membrane modules 700 may be lowered so that the water can flow between the modules well.

Accordingly, as illustrated in FIG. 22, the upper frame 710 and the lower frame 720 each may further be provided with interval holding portions to keep an interval between the separation membrane modules 700. Specifically, one or more interval holding portion 712 may be formed at both sides of the upper frame 710 while protruding by a predetermined length. Similarly, one or more interval holding portion 722 may be formed at both sides of the lower frame 720 while protruding. At this time, it is preferable that the interval holding portion 712 of the upper frame and the interval holding portion 722 of the lower frame are formed at the same position and are symmetrical to each other, and the interval holding portion is integrally formed with the upper frame or the lower frame or separately formed to be combined with each other.

In the present embodiment, each of the interval holding portions 712 and 722 are formed at both sides of the upper frame 710 or the lower frame 720 by two, and are located at both ends in the longitudinal direction of the frame. Further, the interval holding portions 712 and 722 protrude from the upper frame 710 or the lower frame 720 by 1 cm and thus when the plurality of the separation membrane modules 700 are disposed, the interval holding portions of the separation membrane modules 700 facing each other come into contact with each other, such that an interval between the respective modules may be maintained at 2 cm.

However, the present disclosure is not limited to this, and the interval holding portion may be formed to protrude from the upper frame or the lower frame by 1 cm or more and thus the interval between the respective modules may be maintained at 2 cm or more, such that the interval holding portion may be formed only one side without being formed at both sides of the respective frames. At this time, it is preferable that the interval between the respective modules is 2 cm or more so that water may flow well without being stagnated between the respective separation membrane modules 700, but if the interval is too wide, a large installation space of the separation membrane module is required and the filtration efficiency is reduced. As a result, it is preferable that the interval between the respective modules is 4 cm or less.

Further, the interval holding portions 712 and 722 may further include a coupling portion for easily coupling them to other interval holding portions facing each other. For example, the coupling portion may be formed of a magnet, and an S pole may be formed at the interval holding portion located on one side of the frame, and an N pole may be formed at the interval holding portion located at the other side thereof, such that the interval holding portions may be coupled with each other when the plurality of separation membrane modules 700 are disposed. Therefore, the interval between the respective modules may be firmly maintained in spite of the reciprocating motion of the separation membrane module 700.

Next, the structure in which the membrane support frame 600 and the plurality of separation membrane modules 700 are installed inside the membrane support frame 600 will be described.

First Embodiment

First, the structure of the membrane support frame 600 according to the first embodiment and the separation membrane module 700 disposed therein will be described with reference to FIG. 23. For reference, FIG. 23 illustrates that four separation membrane modules are disposed inside one membrane support frame to effectively show the disposition structure of the separation membrane module, but the number of membrane modules is not limited thereto. Therefore, tens of separation membrane modules may be disposed inside one membrane support frame.

In the present embodiment, the membrane support frame 600 may have a shape of a rectangular frame and may include an auxiliary frame 620 on which the plurality of separation membrane modules 700 are installed, in which the auxiliary frame 620 is generally disposed at a lower part of the membrane support frame 600. Therefore, the plurality of separation membrane modules 700 may be coupled to the auxiliary frame 620 by a bolt or may be coupled by inserting the plurality of separation membrane modules 700 into rails formed on the auxiliary frames 620. In detail, the lower frames 720 of the separation membrane module are installed on the auxiliary frame 620 and the upper frames 710 of the separation membrane module are fixed to the membrane support frame 600 or a separate frame like the auxiliary frame.

However, the present disclosure is not limited thereto, and the separation membrane module 700 may be installed on the auxiliary frame 620 by various methods as well as each of the plurality of separation membrane modules 700 may be directly installed on the membrane support frame 600.

The auxiliary frame 620 may be formed in a rectangular plate corresponding to the lower surface of the membrane support frame 600 or may also be formed in a plurality of bar shapes formed at a lower part of the membrane support frame 600 in parallel depending on a direction in which a plurality of separation membrane modules 700 are disposed in the membrane support frame 600.

The plurality of separation membrane modules 700 may be installed in parallel in the membrane support frame 600, that is, on the auxiliary frame 620. In the present embodiment, each separation membrane module 700 has a long rectangular shape and therefore the installation structure of the entire combined separation membrane module has a square or rectangular shape as illustrated in FIG. 23.

The plurality of membrane support frames 600 are disposed inside the treatment tank 300 again. Since the installation structure of the separation membrane module 700 has a rectangular shape as described above, the separation membrane module 700 may be densely disposed, such that a dead zone in the treatment tank 300 may be reduced or minimized, thereby improving the filtration capability. However, the present disclosure is not limited thereto, and the installation structure of the separation membrane module may be disposed in various shapes.

In this case, since the interval holding portions 712 and 722 are formed in the upper frame 710 and the lower frame 720 of the separation membrane module, respectively, the interval between the respective modules may be maintained when the plurality of separation membrane modules 700 are disposed side by side.

Second Embodiment

Next, the structure of the membrane support frame 600 according to the second embodiment and the separation membrane module 700 disposed therein will be described with reference to FIG. 24.

In the present embodiment, the membrane support frame 600 has the shape of the rectangular frame and further includes a filtration pipe 640 formed on the upper side of the membrane support frame 600. Specifically, the filtration pipe 640 is installed to cross the center of the upper surface of the membrane support frame 600.

Further, like the first embodiment, the auxiliary frame 620 on which the plurality of separation membrane modules 700 are installed may be provided, in which the auxiliary frame 620 is generally disposed at the lower part of the membrane support frame 600.

Coupling holes 642 for coupling the plurality of separation membrane modules 700 are formed at both sides of the filtration pipe 640, and the respective upper frames 710 of the separation membrane modules are coupled to the respective coupling holes 642, such that the water collecting portion 711 formed inside the upper frame 710 and the filtration pipe 640 can communicate with each other. That is, in the present embodiment, the filtration pipe 640 is disposed to be perpendicular to the direction in which the reciprocating frame 250 reciprocates, and a plurality of the separation membrane modules 700 are symmetrically and parallelly coupled at both sides.

At this time, since the plurality of membrane support frames 600 are disposed consecutively in the direction in which the reciprocating frame 250 reciprocates, it is preferable to dispose the filtration pipe as in the present embodiment rather than to dispose the filtration pipe in parallel with the reciprocating motion direction for the convenience of structure due to the installation space to secure the filtered water discharger or the like.

Accordingly, in the plurality of separation membrane modules, the filtered water collected in the respective collecting portions 711 may be collected in the filtration pipe 640, which will be described in detail below. Further, the respective lower frames 720 of the separation membrane modules 700 may be coupled to the auxiliary frame 620 by a bolt or may be coupled by inserting the plurality of separation membrane modules 700 into the rails formed on the auxiliary frames 620. However, the present disclosure is not limited thereto, and the separation membrane module 700 may be installed on the auxiliary frame 620 by various methods as well as each of the plurality of separation membrane modules 700 may be directly installed on the membrane support frame 600.

According to the present embodiment, the installation structure of the coupled separation membrane module has a rectangular shape as illustrated in FIG. 24 and like the first embodiment, the separation membrane modules 700 may be densely disposed to reduce or minimize the dead zone within the treatment tank 300, thereby improving the filtration capability.

In this case, since the interval holding portions 712 and 722 are formed in the upper frame 710 and the lower frame 720 of the separation membrane module, respectively, the interval between the respective modules may be constantly maintained when the plurality of separation membrane modules 700 are disposed side by side.

In addition, although the description has been made that the interval between the separation membrane modules 700 is maintained, the separation membrane module may also include the interval holding portion formed only on one side of the frame. In a particular example, two separation membrane modules in which the interval holding portion is formed only on the left and the right, respectively, are bound to form one set, such that a constant interval may be maintained for each of two separation membrane modules. In addition, three separation membrane modules may be formed as one set so that an interval is maintained for each of the three modules.

Accordingly, it is possible to improve the filtration ability by forming the separation membrane more densely while reducing or preventing water from stagnating between the separation membrane modules.

As the reciprocating motion of the separation membrane module 700 is made by the reciprocating portion 200, an inertial force acting on the separation membrane module 700 is generated, which may reduce or prevent contaminants from being attached to the surface of the separation membrane or remove contaminants from the surface of the separation membrane.

At this time, in order to improve or maximize the effect of preventing foreign matters from being attached or removing foreign matters by the inertial force, the looseness of the separation membrane is preferably maintained at an appropriate level.

If the separation membrane module 700 is not loosened, even though the separation membrane module 700 reciprocates integrally by the reciprocating motion of the membrane support frame 600, the inertial force may not be significantly imparted and the separation membrane module 700 may be broken or damaged. If the separation membrane module 700 is too loose, the inertial force may not be significantly imparted and the reciprocating distance of the separation membrane module 700 is increased to require a large installation space.

Therefore, a length of the hollow fiber membrane 730 may preferably be formed by adding a length greater than 0% and not more than 10% of the distance Lo to a distance Lo between the upper frame 710 and the lower frame 720. That is, an extra length of 10% or less with respect to a maximum length (hereinafter, referred to as 'minimum separation membrane length') in a state where a tensile force is not applied to strands of the hollow fiber membrane 730 connected to the upper frame 710 and the lower frame 720, respectively, may be further imparted, in particular, it is preferable to impart an extra length of 5% to 10%.

Specifically, as illustrated in FIG. 25, a maximum length Lf of the separation membrane that can generate the inertial force in the separation membrane due to the reciprocating motion may be determined by a minimum separation membrane length, that is, the vertical distance Lo between the upper frame 710 and the lower frame 720. A reciprocating distance a of the separation membrane modules and the looseness of the separation membrane module 700 can be defined as a value by dividing the maximum length Lf of the separation membrane by the minimum length Lo of the separation membrane. That is, the looseness of the separation membrane module 700 is preferably greater than 1 and not more than 1.1, particularly preferably not less than 1.05 and not more than 1.1.

For example, if the minimum separation membrane distance Lo, that is, the vertical distance between the upper frame 710 and the lower frame 720 is 500 mm based on the reciprocating distance a of the separation membrane module 700 of 100 mm, as illustrated in FIG. 26, the maximum length Lf of the separation membrane can be calculated as 538.5 mm by triangulation, and it is preferable that a value of 1.08 (accurately, 1.077) can be obtained if the looseness is calculated. At this time, however, if the reciprocating distance is 150 mm, the maximum length Lf of the separation membrane becomes 583.1 mm and the looseness has a value of about 1.17 (accurately 1.166). As a result, the looseness exceeds 1.1, which is not preferable. In this case, the reciprocating distance may be reduced or the minimum separation membrane length may be increased.

Further, if the minimum separation membrane length Lo is 750 mm when the reciprocating distance of the separation membrane module 700 is 100 mm, the maximum length Lf of the separation membrane is calculated as 776.2 mm and thus the looseness corresponds to 1.03 and if the minimum length Lo of the separation membrane is 1000 mm, the maximum length Lf of the separation membrane is calculated as 1019.8 mm and thus the looseness corresponds to 1.02, all of which is preferable.

However, when the reciprocating distance of the separation membrane module 700 is 100 mm as described above, if the minimum length Lo of the separation membrane is 1500 mm, the maximum length Lf of the separation membrane is calculated as 1513.3 mm and thus the looseness approaches 1, it is difficult to impart the inertial force to the separation membrane, which is not preferable. In this case, the reciprocating distance of the separation membrane module 700 needs to be further increased or the minimum length Lo of the separation membrane is preferably reduced.

As described above, since the looseness of the separation membrane module 700 is important in reducing or removing the contamination of the separation membrane due to the reciprocating motion, a length adjuster for adjusting the looseness of the separation membrane module 700 depending on the reciprocating distance of the membrane filtration system may be further provided.

The length adjuster may be formed to adjust the minimum length of the separation membrane, that is, the length between the upper frame 710 and the lower frame 720 or may also be formed to adjust the length of the separation membrane itself. This will be described in detail below according to the embodiment.

First, describing the length adjuster 740 according to the first embodiment with reference to FIG. 26, to adjust the length between the upper frame 710 and the lower frame 720, the length adjuster 740 is formed to vertically drive one side of the separation membrane module 700, that is, the auxiliary frame 620 of the membrane support fame on which the lower frame 720 is fixedly installed.

Specifically, the length adjuster 740 according to the first embodiment may be formed of a hydraulic cylinder 742 located under the auxiliary frame 620 and the hydraulic cylinder 742 may be fastened or welded to the lower part of the auxiliary frame 620 by a bolt or welding to be fixed.

At least one hydraulic cylinder 742 may be installed at the lower part of the auxiliary frame 620, and the hydraulic cylinder 742 may be disposed at an appropriate position according to the number of hydraulic cylinders. In the present embodiment, four hydraulic cylinders 742 are disposed at each apex of the auxiliary frame 620 formed in a square.

Accordingly, if a user drives the hydraulic cylinder 742, the auxiliary frame 620 moves in a vertical direction as a whole while the upper frame 710 of the separation membrane module is fixed, and the lower frame 720 of the separation membrane module moves integrally in a vertical direction, such that the minimum length of the separation membrane may be adjusted. That is, if the auxiliary frame 620 moves upward by driving the hydraulic cylinder 742 while the length of the separation membrane is maintained, the lower frame 720 also moves upward and the distance from the upper frame 710 is reduced, such that the minimum length of the separation membrane is reduced and the looseness of the separation membrane module 700 is increased.

If the auxiliary frame 620 moves downward by driving the hydraulic cylinder 742, the lower frame 720 also moves downward and the distance from the upper frame 710 is reduced, such that the minimum length of the separation membrane is increased and the looseness of the separation membrane module 700 is reduced.

Although the operation of the hydraulic cylinder 742 may be performed by the user, a processor 744 that calculates the appropriate minimum length of the separation membrane based on the preferable looseness of the separation membrane according to the reciprocating distance or the reciprocation period of the separation membrane may determine the vertical movement amount of the auxiliary frame 620 and a driver 746. The driver 746 drives the hydraulic cylinder 742 by transmitting the calculated vertical movement amount to the hydraulic cylinder 742 so that the operation of the hydraulic cylinder may be automatically controlled.

A length adjuster 1740 according to a second embodiment will now be described with reference to FIG. 27. The length adjustor 1740 adjusts the length between the upper frame 710 and the lower frame 720 like the first embodiment, and is formed to vertically drive the position of the lower frame 720 while the upper frame 710 of the separation membrane module is fixed. That is, to vertically drive the auxiliary frame 620 of the membrane support frame on which the lower frame 720 is fixedly installed.

Specifically, the length adjuster 1740 according to the second embodiment includes a shaft 1742 installed under the auxiliary frame 620, at least one cam 1744 coupled to the shaft 1742 to be integrally rotatable, and a motor 1746 for rotating the shaft 1742. The motor 1746 may be installed inside the treatment tank 300, but may be installed outside.

The plurality of shafts 1742 may be formed in parallel under the auxiliary frame 620, and in the present embodiment, two shafts are formed to face each other in alignment with the corners of the auxiliary frame 620. At least one cam 1744 is coupled to be integrally rotatable according to the rotation of the shaft 1742. The height of the lower frame 620 may be adjusted as the radius of the cam is changed according to the rotation of the cam 1744.

Although the operation of the motor 1746 may be performed by the user, like the first embodiment, the processor that calculates the vertical movement amount of the auxiliary frame 620 and the driver may control the rotation of the shaft 1742 by transmitting the calculated vertical movement amount to the motor 1746 to automatically perform the operation.

Further, the length adjuster may adjust the length of the separation membrane itself according to the embodiment. Specifically, a winding portion winds and unwinds one end of the separation membrane module, that is, the one end of the hollow fiber membrane, thereby adjusting the entire length of the separation membrane module.

The embodiments may further include an interval measurer 810 and an interval adjusting portion 820 according to an embodiment, which will be described in detail below with reference to an embodiment.

First Embodiment

FIGS. 16A and 16B are diagrams illustrating an interval measurer. Referring to FIGS. 16A and 16B, the interval measurer 810 may be provided to measure the interval between the membrane support frame 600 or the vane member 410 and the treatment tank 300.

The interval measurer 810 may include a first interval measuring sensor 811 and a second interval measuring sensor 813. The first interval measuring sensor 811 may be a sensor that measures an interval between the membrane support frame 600 and the inner wall of the treatment tank 300. The second interval measuring sensor 813 may be a sensor that measures the interval between the vane member 410 and the bottom of the treatment tank 300.

Referring to FIG. 16A, the first interval measuring sensor 811 is arranged in pairs at both sides of the membrane support frame 600 to measure the interval between the membrane support frame 600 and the inner wall of the treatment tank 300.

If the interval measured by the sensor on any one side is relatively narrower compared to the interval measured by the sensor at the other side or if it is smaller than the preset allowable interval value, the first interval measuring sensor 811 transmits a signal to a user's controller. At this time, the user stops the driving of the reciprocating portion 200 and then again sets the left and right positions of the membrane support frame 600 fastened to the reciprocating frame 250 by a bolt or the like, thereby reducing or preventing the collision with the inner wall of the treatment tank 300.

Referring to FIG. 16B, it can be seen that the second interval measuring sensor 813 is disposed on the lifting blade 413 of the vane member 410. As the membrane support frame 600 reciprocates, the vane member 410 also reciprocates. At this time, the vertical position of the lifting blade 413 may be changed by various vibrations, shaking or the like.

At this time, the second interval measuring sensor 813 measures the interval from the bottom of the treatment tank 300, and if the interval is less than the preset allowable interval value, it gives a signal to the controller of the user and the user stops driving the reciprocating portion 200. Thereafter, the vertical position of the membrane support frame 600 connected to the reciprocating frame 250 by a bolt or the like is reset to reduce or prevent the lifting blade from colliding with the bottom of the treatment tank 300.

Second Embodiment

FIG. 17 is a top view of an interval adjusting portion according to an embodiment of the present disclosure, FIG. 18 is a partial side view of a first interval adjuster illustrated in FIG. 17, FIG. 19 is a partial side view of a second interval adjuster illustrated in FIG. 17, FIG. 20 is a side cross-sectional view illustrating an interlocking between the sludge lifting portion and a second interval adjuster illustrated in FIG. 19, and FIG. 21 is a rear view illustrating the interlocking between the sludge lifting portion and the second interval adjuster illustrated in FIG. 20.

Referring to FIGS. 17A to 21, the interval measurer 860 may be provided to adjust the interval between the membrane support frame 600 or the sludge lifting portion 420 and the treatment tank 300. The interval adjusting portion 860 may include a first interval adjuster 820 for adjusting the interval between the membrane support frame 600 and the inner wall of the treatment tank 300 and a second interval adjuster 850 for adjusting the interval between the sludge lifter 420 and the bottom of the treatment tank 300.

The first interval adjuster 820 may include a control cylinder 821, a moving unit 820a, a first proximity sensor 829, a first interval processor 828, a first hydraulic amount processor 827, and a first driver 826. Referring to FIG. 17, two membrane support frames 600 are connected to the reciprocating frame 250, and the control cylinder 821 may be disposed at the upper end of the reciprocating frame 250 between the pair of membrane support frames 600.

The moving unit 820a is connected to the rod of the control cylinder 821 and supports the membrane support frame 600 and may be disposed to be movable in the width direction of the reciprocating frame 250. The moving unit 820a may include a moving rail 825 and a moving block 822.

Referring to FIG. 18, the moving rail 825 may be disposed in the width direction of the reciprocating frame 250, and the moving block 822 may include a moving wheel 823 to move along the moving rail 825 and may be connected to the membrane support frame 600 by a support beam 824.

The first proximity sensor 829 may be disposed on a side surface of the membrane support frame 600 and the first interval processor 828 may be provided to measure the interval between the membrane support frame 600 and the inner wall of the treatment tank 300 using the signal transmitted from the first proximity sensor 829.

The first hydraulic amount processor 827 may convert the calculated value of the first interval processor 828 into a hydraulic driving value to provide a signal to the first driver 826. The first driver 826 may drive the control cylinder 821 depending on the hydraulic driving value of the first hydraulic amount processor 827.

For example, when the interval between the inner wall of the treatment tank 300 and the membrane support frame 600 does not reach the preset allowable interval value, the first proximity sensor 829 transmits information to the first interval processor 828 and the first interval processor 828 calculates the interval and then transmits the information to the first hydraulic amount processor 827, the first hydraulic amount processor 827 calculates a necessary hydraulic pressure driving value.

Further, if the calculation is made, the information is transmitted to the hydraulic driver, and the control cylinder 821 advances or retracts the moving block 822 as necessary.

Accordingly, the moving block 822 moves along the moving rail 825, and the position of the membrane support frame 600 is adjusted.

A side block is disposed on the reciprocating frame 250 to help support the membrane support frame 600. Referring to FIG. 17, a first side block is disposed at four edges of the reciprocating frame 250, and is also connected and supported to the membrane support frame 600 by the support beam 832.

The protrusion 831a of the first side block may be disposed to contact the linear bearing 833 to smooth the linear movement in the second side block 834, and the user fastens the cover 835 by the bolt 835 to fix the cover 835. Four side blocks are disposed on the reciprocating frame 250, and each of them supports the movement in the width direction of the membrane support frame by the control cylinder 821.

The second interval adjuster 850 may include a second proximity sensor 851, a second interval processor 852, a second hydraulic amount processor 853, and a second driver 854.

The second proximity sensor 851 may be disposed on the lifting blade 480 to measure the interval between the lifting blade 480 and the bottom of the treatment tank 300. The second interval processor 852 may be provided to calculate the interval between the lifting blade 480 and the bottom of the processing path 300 by a signal transmitted from the second proximity sensor 851.

The second hydraulic amount processor 853 may be provided to convert the calculated value of the second interval processor 852 into the hydraulic driving value. The second driver 854 may be provided to drive the hydraulic cylinder 431 depending on the hydraulic pressure value of the second hydraulic amount processor 853.

For example, the second proximity sensor 851 measures the interval between the flotation blade 480 and the bottom of the treatment tank 300 and if the measured interval value does not reach a preset allowable interval value, the second interval processor 852 gives a signal to the second interval processor 852. The second interval processor 952 calculates the interval between the lifting blade 480 and the bottom of the treatment tank 300 from the signal transmitted from the second proximity sensor 851, and if the calculated value is transmitted to the second hydraulic amount processor 853, the second hydraulic amount processor 853 converts the calculated value into the hydraulic driving value and then gives a signal to the second driver 854.

Accordingly, the second driver 854 drives the hydraulic cylinder 431 to adjust the vertical position of the second vane body 441. When the position of the second vane body 441 moves upward, the third vane body 470 and the lifting vane 480 connected to the lower end of the second vane body 441 adjust the interval while moving upward.

As described above, the first interval adjuster 820 and the second interval adjuster 850 may calculate the interval between the membrane support frame 600 or the sludge lifting portion 420 and the treatment tank 300 and automatically readjusts the interval if the calculated interval does not reach the preset allowable interval range, thereby reducing or preventing the reduction in the facility operation efficiency and the equipment damage due to the impact between the facilities.

Hereinafter, the filtered water discharger will be described in detail with reference to an embodiment. The filtered water discharger has a structure for recovering the filtered water treated by the separation membrane module 700 to the outside, and includes a flexible pipe in common, such that the filtered water discharger may avoid damaged and the filtered water may be easily recovered despite the reciprocating motion of the separation membrane module 700.

First Embodiment

First, a filtered water discharge unit 900 according to a first embodiment will be described with reference to FIG. 28. The present embodiment will be described with reference to the disposition structure of the membrane support frame and the membrane module according to the first embodiment illustrated in FIG. 23.

The filtered water discharger 900 may include a water collecting pipe 920, a first recovery pipe 940, and a second recovery pipe 960.

As illustrated in FIG. 23, when the plurality of separation membrane modules 700 are disposed inside the membrane support frame 600, the sewage (or wastewater) is filtered inwardly from the outside through the hollow fiber membranes 730 of each separation membrane module and is collected in the water collecting portion 711 of the upper frame.

One or more discharge holes 714 are formed on the upper sides of the respective upper frames 710. The water collecting pipe 920 may be installed with communicating with the water collecting portions 711 of the respective separation membrane modules through the discharge holes 714. That is, the water collecting pipe 920 crosses the plurality of separation membrane modules 700 and is installed with communicating with the respective water collecting portion 711, such that the filtered water collected in the respective water collecting portions 711 may be collected in one water collecting pipe 920.

According to the present embodiment, the water collecting pipe 920 communicates with each of the collecting portions 711 via the discharge hole 714 formed at the centers of each upper frame 710 and is installed with respect to the membrane support frame 600, but the present embodiment is not limited thereto. Therefore, a plurality of discharge holes may be formed at an upper side depending on the length of the upper frame 710 or the like and a plurality of water collecting pipes 920 may be installed.

To recover the filtered water collected in the water collecting pipe 920 to the outside, the water collecting pipe 920 may be coupled with one or more first recovery pipe 940 and in the present embodiment, two first recovery pipes 940 may be coupled with both ends of the water collecting pipe 920. The first recovery pipe 940 is formed of a rigid pipe, and may have any shape such as an S-letter shape or a straight shape.

Next, each of the second recovery pipes 960 is connected to the first recovery pipe 940, respectively, in which the second recovery pipe 960 is flexible. Accordingly, despite the reciprocating motion of the separation membrane module 700, the filtered water discharger 900 is not damaged and the filtered water can be easily recovered.

A suction pump may be connected to the second recovery pipe 960 to suck the inflow water from the outside of the hollow fiber membrane 730 to the inside of the hollow fiber membrane 730 and to filter the sucked inflow water and the filtered water recovered through the second recovery pipe 960 may be stored in a separate tank.

That is, the filtered water that flows from the outside of the hollow fiber membrane 730 of the separation membrane module into the inside thereof and is filtered is first collected in the water collecting portion 711 of the upper frame 710 and the filtered water collected in each of the water collecting portions 711 is again collected in one water collecting pipe 920 and recovered to the outside via the first recovery pipe 940 and the second recovery pipe 960.

In the present embodiment, the rigid first recovery pipe connected to the water collecting pipe and a flexible second recovery pipe are separately formed, but a flexible pipe may be directly connected to the water collecting pipe.

Second Embodiment

Next, a filtered water discharge unit 1900 according to a second embodiment will be described with reference to FIG. 29. The present embodiment will be described with reference to the disposition structure of the membrane support frame and the membrane module according to the second embodiment illustrated in FIG. 24.

The filtered water discharger 1900 may include a first recovery pipe 1940 and a second recovery pipe 1960.

As illustrated in FIG. 24, the membrane support frame 600 includes the filtration pipe 640 formed at the center of the upper part thereof, and the plurality of separation membrane modules 700 that are coupled to both sides of the filtration pipe 640. The upper frame 710 of each of the separation membrane modules is inserted into the coupling hole 642 formed in the filtration pipe 640, such that the filtered water collected in each of the water collecting portions 711 may be collected in one filtration pipe 640.

To recover the filtered water collected in the filtration pipe 640 to the outside, the water collecting pipe 640 may be coupled with one or more first recovery pipe 1940. In the present embodiment, two first recovery pipes 1940 may be coupled with both ends of the filtration pipe 640. The first recovery pipe 1940 is formed of a rigid pipe, and may have any shape such as an S-letter shape or a straight shape.

Each of the second recovery pipes 1960 is connected to the first recovery pipe 1940, respectively, in which the second recovery pipe 1960 is flexible. Accordingly, despite the reciprocating motion of the separation membrane module 700, the filtered water discharger 1900 is not damaged and the filtered water can be easily recovered.

Like the first embodiment, a suction pump may be connected to the second recovery pipe 1960, and the filtered water recovered through the second recovery pipe 1960 may be stored in a separate tank by a suction force.

That is, the filtered water that flows from the outside of the hollow fiber membrane 730 of the separation membrane module into the inside thereof and is filtered is first collected in the water collecting portion 711 of the upper frame 710. The filtered water collected in each of the water collecting portions 711 is again collected in one filtration pipe 640 and recovered to the outside via the first recovery pipe 1940 and the second recovery pipe 1960.

In the present embodiment, the rigid first recovery pipe connected to the filtration pipe and a flexible second recovery pipe are separately formed, but a flexible pipe may be directly connected to the filtration pipe.

According to each embodiment, the structure in which the plurality of membrane support frames 600 are installed in the treatment tank 300 will be described with respect to FIGS. 30 to 33.

The plurality of membrane support frames 600 are generally disposed in the treatment tank 300 depending on filtration capacity of sewage (or wastewater) or the like. The plurality of membrane support frames 600 may be arranged long in a row or may also be divided into a plurality of columns depending on a site area or the like.

In the following description, each embodiment will be described with ten membrane support frames 600 installed inside the treatment tank 300 but the number is not limited thereto.

First Embodiment

According to the first embodiment, ten membrane support frames 600 are arranged in a row in the treatment tank 300, and reciprocate integrally while being connected to one reciprocating portion 200.

This may be applied when the site where the treatment tank 300 is installed has a long length but has an insufficient width.

As described above, the reciprocating portion 200 may include the reciprocating frame 250 and the driver 205, and is connected to the membrane support frame 600 to reciprocate the membrane support frame.

Specifically, the reciprocating frame 250 is a portion that is connected to the membrane support frame 600 to support the membrane support frame 600. The driver 205 may be disposed in the treatment tank 300 and be connected to one side of the frame 250 to move the reciprocating frame 250.

According to the present embodiment, since the ten membrane support frames 600 are connected to one reciprocating portion 200, the ten membrane support frames 600 are arranged in a row in one reciprocating frame 250. At this time, all of the ten membrane support frames 600 may be connected to be installed in a row in the reciprocating frame 250 having one frame, but as illustrated in FIG. 30, the reciprocating frame 250 is formed to have chambers corresponding to the number of membrane support frames 600 to be installed. That is, in the present embodiment, the reciprocating frame 250 is formed to have 10 chambers and thus the membrane support frame 600 may be installed in each chamber. Accordingly, when the membrane support frame 600 is damaged or has a problem, the membrane support frame 600 may be individually replaced and installed simpler.

According to the present embodiment, a large driving force is required since the plurality of membrane support frames 600 need to reciprocate by one reciprocating portion 200.

Second Embodiment

According to the second embodiment, ten membrane support frames 600 are arranged in a row in the treatment tank 300 and are divided into five at both sides and each of the five membrane support frames 600 is connected to one reciprocating portion 200. Therefore, the set of membrane support frames 600 divided into five at both sides may reciprocate separately. That is, the sets of membrane support frames 600 at both sides may reciprocate in the same direction, but may also reciprocate in different directions.

Like the first embodiment, this may be applied when the site where the treatment tank 300 is installed has a long length but has an insufficient width.

Specifically, in the present embodiment, since the ten membrane support frames 600 are divided into two sets at both sides and each set is connected to one reciprocating portion 200, the reciprocating portions 200 are installed at both sides of the treatment tank 300, respectively and each of the five membrane support frames 600 are disposed in a row in one reciprocating frame 250.

At this time, all of the sets of five membrane support frames 600 may be connected to be installed in a row in the reciprocating frame 250 having one frame, but as illustrated in FIG. 31, the reciprocating frame 250 is formed to have chambers corresponding to the number of membrane support frames 600 to be installed. That is, in the present embodiment, the reciprocating frame 250 is formed to have 5 chambers and thus the membrane support frame 600 may be installed in each chamber. Accordingly, when the membrane support frame 600 is damaged or has a problem, the membrane support frame 600 may be individually replaced and installed simpler.

According to the present embodiment, the ten membrane support frames do not reciprocate integrally by one reciprocating portion, but are separated by five membrane support frames 600 and connected to two reciprocating portions 200. Therefore, each set reciprocates in an opposite direction to each other at an interval between the sets of five membrane support frames 600 without applying a large driving force to generate a swirl, thereby obtaining the sludge lifting effect.

Third Embodiment

According to the third embodiment, ten membrane support frames 600 are divided into two rows by five and arranged in the treatment tank 300 and each of the five membrane support frames 600 is connected to one reciprocating portion 200 to reciprocate integrally.

This may be applied when the site where the treatment tank 300 is installed has a large width but has an insufficient length.

Specifically, according to the present embodiment, since the ten membrane support frames 600 are connected to one reciprocating portion 200, the ten membrane support frames 600 are arranged side by side in two row in one reciprocating frame 250.

At this time, all of the ten membrane support frames 600 may be connected while being divided by five and installed in two rows in the reciprocating frame 250 having one frame, but as illustrated in FIG. 32, the reciprocating frame 250 is formed to have chambers corresponding to the number of membrane support frames 600 to be installed. That is, in the present embodiment, the reciprocating frame 250 is formed to have a total of 10 chambers by being divided into five as two rows and thus the membrane support frame 600 may be installed in each chamber. Accordingly, when the membrane support frame 600 is damaged or has a problem, the membrane support frame 600 may be individually replaced and installed simpler.

According to the present embodiment, a large driving force is required since the plurality of membrane support frames 600 need to reciprocate by one reciprocating portion 200.

Fourth Embodiment

According to the fourth embodiment, ten membrane support frames 600 are divided into two rows by five and arranged in the treatment tank 300 and is connected to a separate reciprocating portion 200 in each row. Accordingly, the set of membrane support frames 600 in each row may reciprocate separately. That is, the sets of membrane support frames 600 in each row may reciprocate in the same direction, but may also reciprocate in different directions.

Like the third embodiment, this may be applied when the site where the treatment tank 300 is installed has a large width but has an insufficient length.

Specifically, in the present embodiment, since the ten membrane support frames 600 are divided into two rows and each set is connected to one reciprocating portion 200, two reciprocating portions 200 are installed side by side at one side of the treatment tank 300, respectively and each of the five membrane support frames 600 is disposed in a row in one reciprocating frame 250.

At this time, all of the sets of five membrane support frames 600 may be connected to be installed in a row in the reciprocating frame 250 having one frame, but as illustrated in FIG. 33, the reciprocating frame 250 is formed to have chambers corresponding to the number of membrane support frames 600 to be installed. That is, in the present embodiment, the reciprocating frame 250 is formed to have 5 chambers and thus the membrane support frame 600 may be installed in each chamber. Accordingly, when the membrane support frame 600 is damaged or has a problem, the membrane support frame 600 may be individually replaced and installed simpler.

According to the present embodiment, as in the third embodiment, the ten membrane support frames do not reciprocate integrally by one reciprocating portion, but are separated by five membrane support frames 600 in each row and connected to the reciprocating portions 200. Therefore, each set reciprocates in an opposite direction to each other at an interval between the sets of membrane support frames 600 in each row without applying a large driving force to generate a swirl, thereby obtaining the sludge lifting effect.

Further, as each row reciprocates in different directions, vibration due to reciprocating motion may be offset, such that vibration generated in the treatment tank 300 is reduced and stable.

Hereinafter, a controller 1000 and a method for controlling a membrane filtration system will be described.

The membrane filtration system may further include the controller 1000 that controls the reciprocating distance or the frequency of the separation membrane module 700.

The controller 1000 controls the distance or the frequency at which the separation membrane reciprocates in the separation membrane module 700 depending on the operation conditions, the contamination level or the like of the separation membrane module 700. In the present embodiment, the controller 1000 may be configured to include a contamination measurer 1200 that measures the contamination level of the separation membrane module 700 and a regulation controller 1400 for controlling the reciprocating distance or the frequency of the separation membrane module 700 depending on the contamination level measured by the contamination measurer 1200.

The contamination measurer 1200 may measure the contamination level of the separation membrane module 700 by measuring the transmembrane pressure (TMP) of the separation membrane. In the membrane filtration system, the contamination level of the membrane module 700 will be measured low at the time of an initial operation or an operation after backwashing is performed, and after the filtration has been performed for a considerable time, the contamination level of the separation membrane module 700 will be measured high.

Accordingly, the regulation controller 1400 may increase the frequency of the separation membrane module 700 as the contamination level of the separation membrane module 700 is increased and reduce the frequency of the separation membrane module 700 as the contamination level of the separation membrane module 700 is reduced. That is, as the contamination level is increased, the reciprocating period of the separation membrane module 700 may be reduced and as the contamination level is reduced, the reciprocating period of the separation membrane module 700 may be increased.

If the frequency of the separation membrane module 700 is increased, the separation membrane reciprocates at a higher speed and the inertial force imparted to the separation membrane becomes larger, such that contaminants attached to the separation membrane may be separated and removed.

However, since energy consumption is increased by increasing the frequency, the energy consumption can be saved and the fouling removal effect of the separation membrane due to the reciprocating motion can be effectively obtained by the appropriate adjustment depending on the contamination level of the separation membrane module 700.

Since the membrane module 700 reciprocates along with the membrane support frame 600 on which the membrane module 700 is installed and the reciprocating frame 250 supporting the membrane support frame 600, the separation membrane module 700 can also be adjusted by adjusting the reciprocating distance and the frequency (period) of the reciprocating frame.

Accordingly, the regulation controller 1400 may control a speed of the motor 210 that is connected to the reciprocating portion 200 to transmit the power.

In the present embodiment, the separation membrane module 700 may be set to reciprocate at 0.5 Hz and can be adjusted to 1 Hz depending on the contamination level of the separation membrane. However, if the frequency exceeds 1 Hz, the energy consumption is increased and the structure of the membrane filtration system may be damaged, which is not preferable.

Further, the regulation controller 1400 may increase the reciprocating distance of the separation membrane module 700 as the contamination level of the separation membrane module 700 is increased and reduce the reciprocating distance of the separation membrane module 700 as the contamination level of the separation membrane module 700 is reduced.

That is, if the reciprocating distance of the separation membrane module 700 is increased when the frequency is kept the same, the speed of the reciprocating motion of the separation membrane is rapid to obtain an effect similar to that of increasing the frequency. If the frequency is increased too much, the structure of the system due to the vibration by the reciprocating motion is likely to be damaged and therefore the reciprocating distance may be increased.

If the reciprocating distance of the separation membrane module 700 is increased, the separation membrane reciprocates at a higher speed and the inertial force imparted to the separation membrane becomes larger, such that contaminants attached to the separation membrane may be separated and removed.

Since the separation membrane module 700 reciprocally moves together with the membrane support frame 600 and the reciprocating frame 250, the reciprocating distance of the reciprocating frame 250 can be adjusted, and thus the reciprocating distance of the separation membrane module 700 can also be adjusted. Accordingly, the regulation controller 1400 may be connected to the reciprocating portion 200 to control the reciprocating distance of the reciprocating frame 250.

Specifically, as described above, the driver 205 includes the motor 210, the first pulley 211, the second pulley 213, the rotor 230, and the link rod 220, the motor 210 and the rotor 230 are rotatably connected to each other through the first pulley 211 and the second pulley 213, and the link rod 220 is rotatably connected between the rotor 230 and the reciprocating frame 250 to convert the rotating motion into the reciprocating motion.

At this time, the rotor 230 is provided with a plurality of connectors 233 connected to the link rod 220 so that the connector 233 through which the link rod 233 is connected to the rotor is changed to adjust the reciprocating distance of the reciprocating frame 250.

That is, when the reciprocating distance of the separation membrane module 700 is increased as the contamination level of the separation membrane module 700 is increased, the regulation controller 1400 can connect the link rod 220 to the connector 233b having a relatively larger interval at the center of the rotor 230 to increase the reciprocating distance of the reciprocating frame 250.

In contrast, when the reciprocating distance of the separation membrane module 700 is reduced as the contamination level of the separation membrane module 700 is reduced, the regulation controller 1400 can connect the link rod 220 to the connector 233a having a relatively narrower interval at the center of the rotor 230 to reduce the reciprocating distance of the reciprocating frame 250.

In addition, the link rod 220 includes the link body 221, the first link hole 223 disposed at one side of the link body 221 and coupled to the connector 233 of the rotor, and the second link hole 225 disposed at the other side of the link body 221 and coupled to the reciprocating frame 250. The first link hole 223 may be machined in plural along the longitudinal direction of the link body 221.

Accordingly, the reciprocating distance of the reciprocating frame 250 can be adjusted and controlled by changing a part of the first link hole 223 of the link rod connected to the connector 233 of the rotor.

That is, when the reciprocating distance of the separation membrane module 700 is increased as the contamination level of the separation membrane module 700 is increased, the regulation controller 1400 can fasten the connector 233 of the rotor to the first link hole 233b relatively farther from the second link hole 225 at the link rod 220 to increase the reciprocating distance of the reciprocating frame 250.

In contrast, when the reciprocating distance of the separation membrane module 700 is reduced as the contamination level of the separation membrane module 700 is reduced, the regulation controller 1400 can fasten the connector 233 of the rotor to the first link hole 233a relatively closer to the second link hole 225 at the link rod 220 to reduce the reciprocating distance of the reciprocating frame 250.

In addition, according to the embodiment, the regulation controller 1400 can control the frequency to be high at the time of the backwash of the separation membrane module 700. In the present embodiment, the frequency can be controlled to be 0.7 Hz at the time of the backwash of the separation membrane module 700, thereby improving the washing efficiency.

According to the present disclosure, it is possible to reduce or prevent the impact between the inner wall of the treatment tank and the membrane support frame by changing the position of the membrane support frame in the width direction when the membrane support frame comes into contact with the side wall of the treatment tank or close thereto at a certain distance or less during the reciprocating motion of the membrane support frame.

In addition, it is possible to reduce or prevent the impact between the lifting blade and the bottom of the treatment tank by changing the vertical position of the lifting blade when the bottom of the treatment bath and the lifting blade are brought into contact with each other or are close to each other at a certain distance or less during the reciprocating motion of the frame support frame.

This can improve the facility operation efficiency of the membrane filtration system.

The above matters are only a specific example of the membrane filtration system.

Hereinabove, preferred exemplary embodiments of the present disclosure are described for illustrative purpose, and the scope of the present disclosure is not limited to the above described specific exemplary embodiment. It will be apparent to those skilled in the art that various variations and modifications may be made without departing from the spirit and scope of the disclosure as defined in the following claims.

What is claimed is:

1. A membrane filtration system (100), comprising:
a treatment tank (300);
a membrane support frame (600) disposed in the treatment tank;
a reciprocator (200) coupled to the membrane support frame and operable to reciprocate the membrane support frame in a sliding direction;
a sludge lifter (400) flexibly disposed on the membrane support frame and operable upon reciprocation of the membrane support frame to lift sludge accumulated in a lower part of the treatment tank.

2. The membrane filtration system of claim 1, further comprising:
a reciprocating frame (250) to interlock the reciprocator with the membrane support frame; and
a slider (500) movably disposed lengthwise on a skid surface of the reciprocating frame and connected to the reciprocator, the slider operable to guide a linear movement of the membrane support frame during reciprocation.

3. The membrane filtration system of claim 2, wherein the slider (500) comprises:
a plurality of sliders (513, 523, 533, 561) fixed to the skid surface of the reciprocating frame;
a plurality of guides (511, 521, 531, 551) disposed in correspondence to the plurality of sliders and fixed with respect to an inner surface of the treatment tank so as to oppose the skid surface of the reciprocating frame; and
a roller (514, 524, 534, 571) respectively disposed between the plurality of sliders and the plurality of guides and configured to roll during reciprocation of the membrane support frame.

4. The membrane filtration system of claim 1, wherein the sludge lifter (400) comprises a plurality of vane members (410, 420), each of the vane members extending in a direction perpendicular to the sliding direction and including:
a first portion (411, 421) that is mounted on a lower side of the membrane support frame and includes a lower end protruding toward a bottom of the treatment tank; and
a second portion (413, 470) that is coupled to the lower end of the first portion and includes a surface forming a lifting blade (413, 480) disposed at a predetermined angle to lift the sludge accumulated in the lower part of the treatment tank by generating swirls during reciprocation of the membrane support frame.

5. The membrane filtration system of claim 4, wherein each vane member (410, 420) further comprises:

a third portion (441) disposed between the first and second portions of each vane member; and an elevation unit (430) arranged to interlock the first and third portions of each vane member and operable to move the second portion of each vane member toward the bottom of the treatment tank by elevating the third portion of each vane member.

6. The membrane filtration system of claim 5, wherein the elevation unit (430) comprises:

a hydraulic cylinder (431) fixed at one end of the first portion; and an elevation rod (433) coupled to a piston rod of the hydraulic cylinder and fixed to the third portion at a plurality of positions along the perpendicular direction.

7. The membrane filtration system of claim 4, further comprising:

an interval adjuster (850) operable to adjust an interval between the sludge lifter and the bottom of the treatment tank; and an interval measuring sensor (813, 851) disposed on the lifting blade and operable to measure the interval between the sludge lifter and the bottom of the treatment tank.

8. The membrane filtration system of claim 7, wherein the interval adjuster (850) includes:

an interval processor (852) to calculate the interval between the sludge lifter and the bottom of the treatment tank using a signal transmitted from the interval measuring sensor;

a hydraulic amount processor (853) to convert a calculated value of the interval processor into a hydraulic driving value; and a driver (854) to drive the hydraulic cylinder based on the hydraulic driving value of the hydraulic amount processor.

9. The membrane filtration system of claim 5, wherein the sludge lifter (400) comprises:

an elastic body (450) disposed between the second and third portions of each vane member and biased toward the second portion of each vane member to counter an impact of the lifting blade colliding with the bottom of the treatment tank; and a shock-absorbing pad (460) disposed at a distal end of the lifting blade to cushion the lifting blade colliding with the bottom of the treatment tank.

10. The membrane filtration system of claim 1, further comprising:

a first interval adjuster (820) operable to adjust an interval between the membrane support frame and an inner wall of the treatment tank; and a first interval measuring sensor (811, 829) disposed on a side surface of the membrane support frame and operable to measure the interval between the membrane support frame and the inner wall of the treatment tank.

11. The membrane filtration system of claim 10, further comprising:

a reciprocating frame (250) to interlock the reciprocator with the membrane support frame, wherein the first interval adjuster (852) includes:

a control cylinder (821) disposed on an upper side of the reciprocating frame;

a moving unit (820a) coupled to a piston rod of the control cylinder to move the membrane support frame in a direction perpendicular to the sliding direction;

a first interval processor (828) to calculate the interval between the membrane support frame and the inner wall of the treatment tank using a signal transmitted from the first interval measuring sensor;

a first hydraulic amount processor (827) to convert a calculated value of the first interval calculator into a hydraulic driving value; and a first driver (826) to drive the control cylinder based on the hydraulic driving value of the first hydraulic amount processor.

12. The membrane filtration system of claim 1, wherein the sludge lifter (400) comprises a plurality of vane members (420), each of the vane members including:

a first vane body (421) disposed on a lower side of the membrane support frame;

a second vane body (441) coupled to a lower end of the first vane body;

a third vane body (470) coupled to a lower end of the second vane body;

a lifting blade (480) arranged to form a predetermined angle with respect to a lower end of the third vane body and operable to lift sludge during a reciprocating motion of the membrane support frame; and an elevation unit (430) arranged to interlock the first vane body and the second vane body and operable to elevate the second vane body.

* * * * *